(12) United States Patent
Sengstaken, Jr.

(10) Patent No.: US 12,354,482 B2
(45) Date of Patent: Jul. 8, 2025

(54) SMART FRAME FOR VEHICLE REGISTRATION PLATE AND RELATED SYSTEM AND METHODS

(71) Applicant: RJR Wireless LLC, Hollis, NH (US)

(72) Inventor: Robert William Sengstaken, Jr., Hollis, NH (US)

(73) Assignee: RJR WIRELESS LLC, Hollis, NH (US)

( * ) Notice: Subject to any disclaimer, the term of this patent is extended or adjusted under 35 U.S.C. 154(b) by 0 days.

(21) Appl. No.: 18/695,054

(22) PCT Filed: May 4, 2023

(86) PCT No.: PCT/US2023/020923
§ 371 (c)(1),
(2) Date: Mar. 25, 2024

(87) PCT Pub. No.: WO2023/215430
PCT Pub. Date: Nov. 9, 2023

(65) Prior Publication Data
US 2024/0395150 A1 Nov. 28, 2024

Related U.S. Application Data

(60) Provisional application No. 63/338,049, filed on May 4, 2022.

(51) Int. Cl.
*B60R 13/10* (2006.01)
*B60R 25/104* (2013.01)
(Continued)

(52) U.S. Cl.
CPC ............. *G08G 1/20* (2013.01); *B60R 13/10* (2013.01); *B60R 25/104* (2013.01); *B60R 25/34* (2013.01);
(Continued)

(58) Field of Classification Search
CPC ........ G08G 1/20; B60R 13/10; B60R 25/104; B60R 25/34; B60R 2325/101; B60R 2325/103; H04W 4/80
See application file for complete search history.

(56) References Cited

U.S. PATENT DOCUMENTS 3,805,231 A 4/1974 Santoli
5,608,391 A * 3/1997 Bantli .................... B60R 13/10
342/51
(Continued)

FOREIGN PATENT DOCUMENTS

EP 2530655 A1 * 12/2012 ............. G07B 15/06
WO 2023215430 A1 11/2023

*Primary Examiner* — Nay Tun
(74) *Attorney, Agent, or Firm* — Hayes Soloway PC

(57) ABSTRACT

A smart frame for a vehicle registration plate and related system and methods are disclosed. The smart frame may be configured to be mounted proximate to a near-field communication (NFC) tag hosted by a vehicle and associated with its vehicle identification number (VIN) or other identifier. In turn, the smart frame may read and relay an identification (ID) code of the NFC tag to a server via cellular communication. In addition, the smart frame may be configured to receive global navigational satellite system (GNSS) signal(s) including data pertaining to the current geophysical location of the smart frame and to relay that over the cellular connection for use in tracking the smart frame (and vehicle, if any). Furthermore, the smart frame may be configured to communicate with external computing device(s) via Bluetooth communication, which may facilitate location and tracking of the smart frame (and vehicle, if any) in a given space.

29 Claims, 6 Drawing Sheets

(51) Int. Cl.
*B60R 25/34* (2013.01)
*G06Q 30/018* (2023.01)
*G08G 1/00* (2006.01)
*G08G 1/017* (2006.01)
*H04W 4/80* (2018.01)

(52) U.S. Cl.
CPC ........... *G06Q 30/018* (2013.01); *G08G 1/017* (2013.01); *B60R 2325/101* (2013.01); *B60R 2325/103* (2013.01); *H04W 4/80* (2018.02)

(56) References Cited

U.S. PATENT DOCUMENTS

| | | | |
|---|---|---|---|
| 6,025,784 A | 2/2000 | Mish | |
| 6,641,038 B2* | 11/2003 | Gehlot | B60R 13/10 40/200 |
| 7,449,998 B1* | 11/2008 | Au | G09F 21/04 455/99 |
| 7,696,864 B2* | 4/2010 | Dillon | G08G 1/205 345/5 |
| 8,836,490 B2 | 9/2014 | Silzer, Sr. et al. | |
| 9,221,405 B2* | 12/2015 | Davis | B60R 13/10 |
| 10,589,699 B2* | 3/2020 | Mason | G06F 1/3265 |
| 12,039,547 B2* | 7/2024 | Mays | B60Q 1/543 |
| 2004/0189493 A1* | 9/2004 | Estus | G08G 1/20 340/988 |
| 2006/0213100 A1* | 9/2006 | McCann | G09F 21/04 40/591 |
| 2015/0353031 A1* | 12/2015 | Cairo | B60R 25/33 340/425.5 |
| 2016/0339871 A1* | 11/2016 | Nyalamadugu | B60R 25/24 |
| 2017/0046929 A1* | 2/2017 | Strom | H04L 67/01 |
| 2017/0066408 A1* | 3/2017 | Nyalamadugu | B60R 25/24 |
| 2017/0303071 A1* | 10/2017 | Haverinen | H04B 17/27 |
| 2018/0060008 A1* | 3/2018 | Bender | G06F 16/9537 |
| 2018/0154867 A1* | 6/2018 | Golduber | G06Q 10/02 |
| 2018/0186311 A1* | 7/2018 | Mason | H04W 4/44 |
| 2018/0186331 A1* | 7/2018 | Dubal | B60R 13/10 |
| 2019/0174279 A1* | 6/2019 | Verma | G07B 15/063 |
| 2020/0254926 A1* | 8/2020 | Golduber | G09F 9/372 |

* cited by examiner

SMART FRAME FOR VEHICLE REGISTRATION PLATE AND RELATED SYSTEM AND METHODS

CROSS-REFERENCE TO RELATED APPLICATION

This patent application is a national stage entry under 35 U.S.C. § 371 of PCT International Patent Application No. PCT/US2023/020923, filed on May 4, 2023, which claims the benefit of and priority to U.S. Provisional Patent Application No. 63/338,049, titled "Smart License Frame and Related Systems and Methods," filed on May 4, 2022. Each of these patent applications is herein incorporated by reference in its entirety.

FIELD OF THE DISCLOSURE

The present disclosure relates to vehicle registration plate holders and, more particularly, to a smart vehicle registration plate frame capable of wireless tracking.

BACKGROUND

Vehicle registration plates, also commonly known as license plates or number plates, are normally required by road vehicles such as cars, trucks, and motorcycles. In some instances, such plates also may be required for bicycles, boats, and other modes of transportation. By design, each plate uniquely identifies its host vehicle and is normally recorded within one or more governing vehicle registries. Vehicle registration plates can be physical (as in the case of typical metal or plastic plates) or electronic in design.

SUMMARY

A first example embodiment provides a smart frame for a vehicle registration plate. The smart frame includes an electronics assembly. The electronics assembly includes a global navigational satellite system (GNSS) module configured to receive a GNSS signal including data pertaining to a current geographic location of the smart frame. The electronics assembly also includes a cellular communication module configured to transmit a cellular signal including the data pertaining to the current geographic location of the smart frame. The electronics assembly further includes a motion detection device configured to detect motion of the smart frame and, in response to detection thereof, output a signal which results in the GNSS module activating to receive the GNSS signal.

In some cases, the electronics assembly further includes a near-field communication (NFC) module configured to receive an NFC signal from an NFC tag hosted by a vehicle associated with the vehicle registration plate, the NFC signal including data pertaining to an identifier of the NFC tag. In some such cases, the motion detection device is further configured to detect a change in physical orientation of the smart frame and, in response to detection thereof, output a signal which results in the NFC module activating to receive the NFC signal. In some instances, the signal is output by the motion detection device when the detected change in physical orientation is one from a substantially horizontal orientation of the smart frame to a substantially vertical orientation of the smart frame. In some instances, the cellular signal further includes data pertaining to the detected change in physical orientation of the smart frame. In some cases, the cellular signal further includes the data pertaining to the identifier of the NFC tag. In some cases, the identifier of the NFC tag includes an identification (ID) code of the NFC tag.

In some cases, the smart frame includes an electronics housing portion at least partially housing the electronics assembly, and the electronics assembly further includes an assembly including a GNSS antenna communicatively coupled with the GNSS module and a cellular antenna communicatively coupled with the cellular communication module, wherein the GNSS antenna and the cellular antenna extend beyond an end of the electronics housing portion. In some such cases, the assembly is constructed from at least two rigid circuit board portions connected by at least one physically intervening flexible connector portion.

In some cases, the data pertaining to the current geographic location of the smart frame includes latitude and longitude coordinates. In some cases, the data pertaining to the current geographic location of the smart frame includes geofencing information. In some cases, the data pertaining to the current geographic location of the smart frame includes a Bluetooth beacon identifier received by the smart frame.

In some cases, the cellular signal further includes data pertaining to a current operational status of the smart frame. In some cases, the cellular signal further includes data pertaining to the detected motion of the smart frame.

In some cases, the cellular communication module is configured as a long-term evolution (LTE) CatM cellular modem configured to communicate over an LTE-CatM1 network. In some cases, the cellular communication module is configured as a long-term evolution (LTE)-1 cellular modem or a long-term evolution (LTE)-4 cellular modem. In some cases, the cellular communication module is configured to communicate utilizing a low-power wide-area network (LPWAN) communication protocol. In some such cases, the LPWAN communication protocol includes one or more narrowband Internet of things (NB-IoT) communication protocols. In some other such cases, the LPWAN communication protocol includes one or more long-range wide-area network (LoRaWAN) communication protocols. In some cases, the cellular communication module is configured to transmit the cellular signal to a database server external to the smart frame.

In some cases, the electronics assembly further includes a Bluetooth communication module configured to transmit a Bluetooth signal including data pertaining to a current physical location of the smart frame. In some such cases, the Bluetooth signal further includes data pertaining to an identifier of a near-field communication (NFC) tag hosted by a vehicle associated with the vehicle registration plate and read by the smart frame. In some other such cases, the Bluetooth communication module is configured to communicate utilizing a Bluetooth Low Energy (BLE) protocol. In some other such cases, the Bluetooth communication module is configured to transmit the Bluetooth signal to a computing device external to the smart frame.

In some cases, the electronics assembly further includes a Bluetooth communication module configured to receive a Bluetooth signal including at least one of: (a) data pertaining to an identifier of a vehicle associated with the vehicle registration plate, wherein the Bluetooth signal originates from at least one of: (i) a Bluetooth-compatible key fob or dongle; and (ii) a Bluetooth-compatible element of the vehicle itself; (b) data pertaining to a current physical location of the smart frame relative to a Bluetooth beacon; and (c) data pertaining to an alarm or status alert to be output by the smart frame.

In some cases, the electronics assembly further includes a tampering detection device configured to detect at least one of: (a) tampering with the smart frame; and (b) unauthorized removal of the vehicle registration plate from the smart frame. In some such cases, the cellular signal further includes data pertaining to at least one of: (a) the detected tampering with the smart frame; and (b) the detected unauthorized removal of the vehicle registration plate from the smart frame.

In some cases, the electronics assembly further includes at least one of an audio output device and an optical output device configured to output a signal by which the smart frame is able to be physically located in a given space by a user.

In some cases, the electronics assembly further includes a power supply configured to provide electrical energy to the electronics assembly. In some such cases, the power supply includes a battery. In some instances, the battery is a lithium-ion polymer (LiPo) battery. In some other such cases, the power supply includes a photovoltaic module configured to convert light energy to electrical energy provided to the electronics assembly.

In some cases, the smart frame further includes an electronics housing portion at least partially housing the electronics assembly. In some such cases, the electronics housing portion is configured to be mounted to a vehicle associated with the vehicle registration plate. In some other such cases, the smart frame further includes a frame portion configured to interface with the electronics housing portion such that the vehicle registration plate is disposed between the frame portion and the electronics housing portion in a manner allowing viewing of the vehicle registration plate through the frame portion.

In some cases, a system is provided. The system includes the smart frame described in relation to this first example embodiment and at least one of: (a) a near-field communication (NFC) tag configured to be hosted by a vehicle associated with the vehicle registration plate and to wirelessly communicate with the smart frame; (b) a Bluetooth-compatible key fob or dongle configured to wirelessly communicate with the smart frame; and (c) a Bluetooth beacon configured to wirelessly communicate with the smart frame. In some such cases, the system further includes a database server configured to store: (a) the data pertaining to the current geographic location of the smart frame; (b) data pertaining to an identifier of the NFC tag; and (c) a vehicle identification number (VIN) or other identifier of the vehicle.

A second example embodiment provides a method. The method includes detecting motion of a smart frame for a vehicle registration plate. The method also includes in response to the detected motion of the smart frame, outputting a signal which results in the smart frame receiving a global navigational satellite system (GNSS) signal including data pertaining to a current geographic location of the smart frame. The method further includes transmitting a cellular signal including the data pertaining to the current geographic location of the smart frame.

In some cases, the method further includes detecting a change in physical orientation of the smart frame, and, in response to the detected change in physical orientation of the smart frame, outputting a signal which results in the smart frame receiving a near-field communication (NFC) signal from an NFC tag hosted by a vehicle associated with the vehicle registration plate, the NFC signal including data pertaining to an identifier of the NFC tag. In some such cases, the detected change in physical orientation is one from a substantially horizontal orientation of the smart frame to a substantially vertical orientation of the smart frame. In some other such cases, the cellular signal further includes data pertaining to the detected change in physical orientation of the smart frame. In some other such cases, the cellular signal further includes the data pertaining to the identifier of the NFC tag. In some other such cases, the identifier of the NFC tag includes an identification (ID) code of the NFC tag.

In some cases, the data pertaining to the current geographic location of the smart frame includes latitude and longitude coordinates. In some cases, the data pertaining to the current geographic location of the smart frame includes geofencing information. In some cases, the data pertaining to the current geographic location of the smart frame includes a Bluetooth beacon identifier received by the smart frame.

In some cases, the cellular signal further includes data pertaining to a current operational status of the smart frame. In some cases, the cellular signal further includes data pertaining to the detected motion of the smart frame.

In some cases, the cellular signal is based on a low-power wide-area network (LPWAN) communication protocol. In some such cases, the cellular signal is based on one or more narrowband Internet of things (NB-IoT) communication protocols. In some other such cases, the cellular signal is based on one or more long-range wide-area network (LoRaWAN) communication protocols. In some cases, the cellular signal is transmitted to a database server external to the smart frame.

In some cases, the method further includes transmitting a Bluetooth signal including data pertaining to a current physical location of the smart frame. In some such cases, the Bluetooth signal further includes data pertaining to an identifier of a near-field communication (NFC) tag hosted by a vehicle associated with the vehicle registration plate and read by the smart frame. In some other such cases, the Bluetooth signal is based on a Bluetooth Low Energy (BLE) protocol. In some other such cases, the Bluetooth signal is transmitted to a computing device external to the smart frame.

In some cases, the method further includes receiving a Bluetooth signal including at least one of: (a) data pertaining to an identifier of a vehicle associated with the vehicle registration plate, wherein the Bluetooth signal originates from at least one of: (i) a Bluetooth-compatible key fob or dongle; and (ii) a Bluetooth-compatible element of the vehicle itself; (b) data pertaining to a current physical location of the smart frame relative to a Bluetooth beacon; and (c) data pertaining to an alarm or status alert to be output by the smart frame.

In some cases, the method further includes detecting at least one of: (a) tampering with the smart frame; and (b) unauthorized removal of the vehicle registration plate from the smart frame. In some such cases, the cellular signal further includes data pertaining to at least one of: (a) the detected tampering with the smart frame; and (b) the detected unauthorized removal of the vehicle registration plate from the smart frame.

In some cases, the method further includes outputting at least one of an audio output signal and an optical output signal by which the smart frame is able to be physically located in a given space by a user.

The features and advantages described herein are not all-inclusive and, in particular, many additional features and advantages will be apparent to one of ordinary skill in the art in view of the drawings, specification, and claims. Moreover, it should be noted that the language used in the specification has been selected principally for readability and instructional purposes and not to limit the scope of the inventive subject matter.

Figure 1:
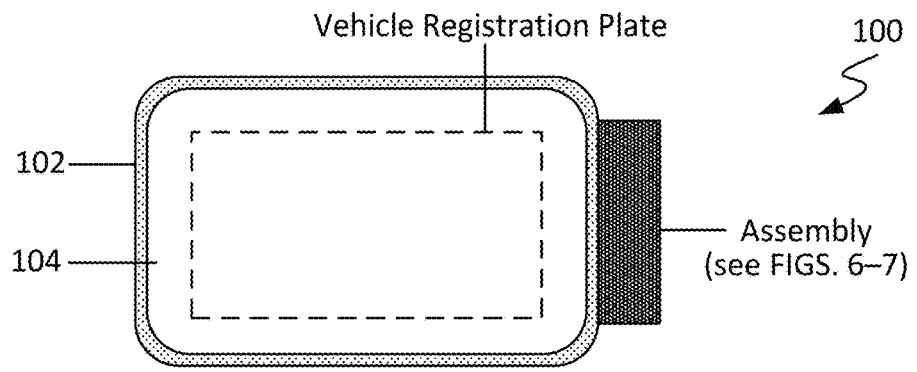
FIG. 1 illustrates a front-facing view of a smart frame configured in accordance with an embodiment of the present disclosure.
Figure 2:
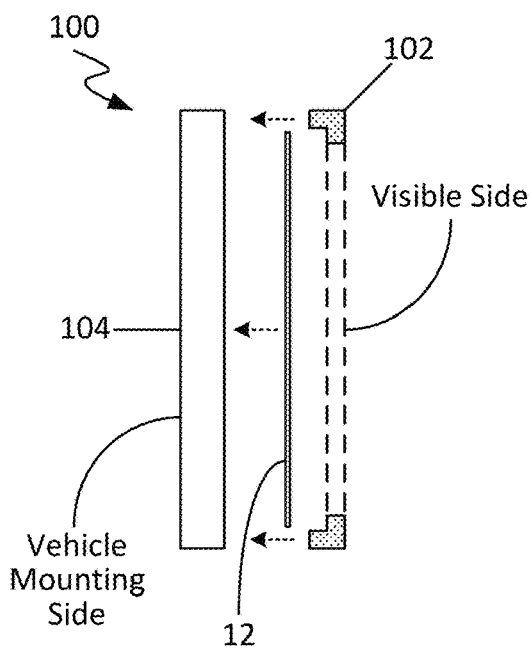
FIG. 2 illustrates an exploded side elevation view of a smart frame with a vehicle registration plate in accordance with an embodiment of the present disclosure.
Figure 3:
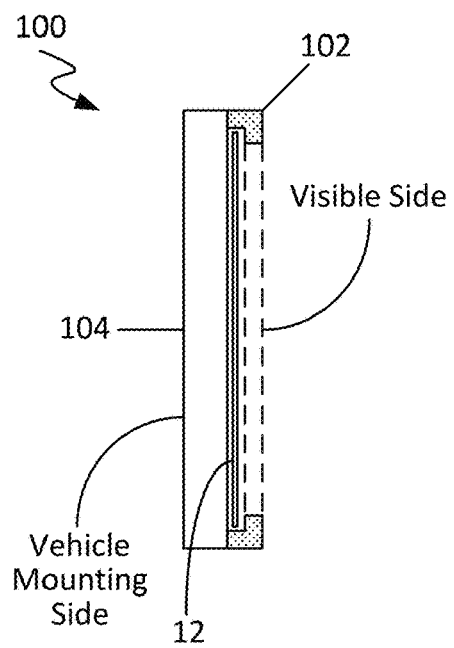
FIG. 3 illustrates an assembled side elevation view of a smart frame with a vehicle registration plate in accordance with an embodiment of the present disclosure.
Figure 4:
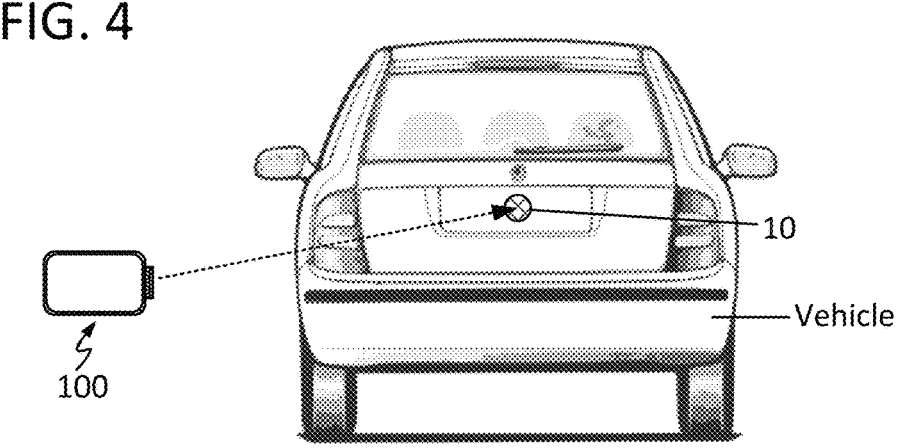
FIG. 4 illustrates an example mounting arrangement of a near-field communication (NFC) tag and a smart frame on a vehicle in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

A smart frame for a vehicle registration plate and related system and methods are disclosed. The disclosed smart frame may be configured, in accordance with some embodiments, to be mounted to a vehicle proximate to (e.g., directly over or otherwise within range of) a near-field communication (NFC) tag hosted by the vehicle and associated with the vehicle identification number (VIN) or other identifier of that vehicle. In turn, the disclosed smart frame may read and relay an identification (ID) code of the NFC tag associated with the VIN of the vehicle to a database server via cellular communication, in accordance with some embodiments. As an alternative, the vehicle may be associated with the smart frame using a Bluetooth-compatible key fob or dongle (e.g., attached to the keys for said vehicle), or the smart frame may receive Bluetooth signal(s) originating from the vehicle, in accordance with some embodiments. In addition, the disclosed smart frame may be configured, in accordance with some embodiments, to receive global navigational satellite system (GNSS) signal(s) including data pertaining to the current geophysical location of the smart frame, and such information also may be relayed over the cellular connection for use in tracking the smart frame (and an attendant vehicle, if any). Furthermore, the disclosed smart frame may be configured, in accordance with some embodiments, to communicate with one or more external computing devices via Bluetooth communication, which may facilitate location and tracking of the smart frame (and any attendant vehicle) in a given space, for example, where reception of GNSS signals might be poor, such as in a warehouse, a dealership, a vehicle lot, a shipping container, or the like. Determination of when and how to perform such functions with the disclosed smart frame may be based, at least in part, on detection of motion and/or a change in physical orientation of the smart frame, for example, using a motion detection device (e.g., an accelerometer or other suitable device), in accordance with some embodiments. Numerous configurations and variations will be apparent in light of this disclosure.

General Overview

There are numerous vehicle and asset tracking systems on the market today. However, these existing systems are often hardwired into the vehicle and, thus, can be associated with only one vehicle. Furthermore, large fleets and automobile dealerships typically have numerous dealer license plates, which they swap between vehicles for demos, loaners, etc. However, they often cannot keep track of the location of the plates nor the usage of the host vehicles.

Thus, and in accordance with some embodiments of the present disclosure, a smart frame for a vehicle registration plate and related system and methods are disclosed. The disclosed smart frame may be configured, in accordance with some embodiments, to be mounted to a vehicle proximate to (e.g., directly over or otherwise within range of) a near-field communication (NFC) tag hosted by the vehicle and associated with the vehicle identification number (VIN) or other identifier of that vehicle. In turn, the disclosed smart frame may read and relay an identification (ID) code of the NFC tag associated with the VIN of the vehicle to a database server via cellular communication, in accordance with some embodiments. As an alternative, the vehicle may be associated with the smart frame using a Bluetooth-compatible key fob or dongle (e.g., attached to the keys for said vehicle), or the smart frame may receive Bluetooth signal(s) originating from the vehicle, in accordance with some embodiments. In addition, the disclosed smart frame may be configured, in accordance with some embodiments, to receive global navigational satellite system (GNSS) signal(s) including data pertaining to the current geophysical location of the smart frame, and such information also may be relayed over the cellular connection for use in tracking the smart frame (and an attendant vehicle, if any). Furthermore, the disclosed smart frame may be configured, in accordance with some embodiments, to communicate with one or more external computing devices via Bluetooth communication, which may facilitate location and tracking of the smart frame (and any attendant vehicle) in a given space, for example, where reception of GNSS signals might be poor, such as in a warehouse, a dealership, a vehicle lot, a shipping container, or the like. Determination of when and how to perform such functions with the disclosed smart frame may be based, at least in part, on detection of motion and/or a change in physical orientation of the smart frame, for example, using a motion detection device (e.g., an accelerometer or other suitable device), in accordance with some embodiments.

In accordance with some embodiments, the disclosed smart frame may be configured to automatically register a host vehicle via NFC-based communication with an NFC tag hosted by said vehicle by providing that information, as well as GNSS information, over a cellular connection to a database server by which a user may locate and/or track the smart frame (and the attendant vehicle, if any). Positioning updates (e.g., latitude and longitude coordinates) and optionally various other information (e.g., speed of the host vehicle, tampering information, etc.) may be sent by the disclosed smart frame to the database server periodically, on-demand, or otherwise as desired, in accordance with some embodiments. In accordance with some embodiments, a software application (which optionally may be cloud-based) may be accessed for each installation location to track usage and location of the smart frame and host vehicle (if any).

In accordance with some embodiments, data pertaining to the smart frame, the NFC tag, the associated vehicle (if any), or other portion of the disclosed system may be stored, in part or in whole, by a database server and viewed by a user at given computing device (mobile or otherwise) external to the smart frame. Furthermore, notifications, such as alarms and alert statuses, may be programmed in the database server for any of a wide range of detected conditions pertaining to the smart frame, including, for example, the current location of the smart frame, the current motion and speed of the smart frame, any detected tampering with the smart frame or unauthorized removal of a vehicle registration plate from the smart frame, the time of day, etc., in accordance with some embodiments.

As will be apparent in light of this disclosure, the disclosed smart frame and related system and techniques may realize any of a wide range of advantages and benefits as compared to existing approaches. In at least some cases, the use of the disclosed smart frame and NFC tag on a vehicle may allow for a simple, cost-effective way of repeatedly, consistently, and automatically associating the smart frame (and an attendant vehicle registration plate) with the VIN information of the host vehicle. Additionally, the disclosed smart frame may be swapped between vehicles quickly and easily, with the current VIN information automatically being read by the smart frame using an NFC pathway and transferred to a database server using a separate cellular communication pathway, in accordance with some embodiments. Also, the disclosed smart frame may be configured, in some embodiments, as a low-power, battery-operated solution having a long operational life per battery charge, at least in some instances. In at least some cases, the disclosed smart frame may have a relatively thin profile and a form factor comparable to typical vehicle registration plate holders used on vehicles.

It should be noted that, at least in some instances, it may not be desirable to attach an NFC tag to a given vehicle. Thus, in accordance with some embodiments, the vehicle instead may be associated with the smart frame using a Bluetooth-compatible key fob or dongle (e.g., attached to the keys for said vehicle) that, when in sufficient proximity, may be associated with the smart frame. Additionally (or alternatively), Bluetooth signal(s) originating from the vehicle may be utilized in associating with the smart frame, in accordance with some embodiments.

Smart Frame Structure and Operation

FIGS. 1-4 illustrate several views of a smart frame 100 configured in accordance with an embodiment of the present disclosure. As can be seen, smart frame 100 may include a frame portion 102 and an electronics housing portion 104 configured to interface with one another so as to receive and retain a vehicle registration plate 12 (e.g., a license plate, a number plate, or the like) in a temporary, semi-permanent, or other desired manner. Frame portion 102 generally may be configured as a frame, bezel, or the like, as typically done with vehicle registration plate holders for mounting on vehicles. Electronics housing portion 104 may be configured, in accordance with some embodiments, to at least partially house (e.g., enclose or otherwise protect) an electronics assembly 200 (discussed below). Portions 102, 104 may be configured to interface with one another in a fastener-based, hinged, sliding, friction fit, snap fit, adhesive-based, or other suitable manner, as will be apparent in light of this disclosure. Generally, smart frame 100 may be configured to be mounted to a vehicle in a manner like that normally done with typical vehicle registration plates. Additionally (or alternatively), smart frame 100 may be configured to be received and retained by a temporary holder (which optionally may be transparent) commonly used by vehicle dealers to hang the vehicle registration plate, for instance, on the rear of the vehicle.

The geometry and dimensions of portions 102, 104 (and, thus, smart frame 100 more generally) may be customized, as desired for a given target application or end-use. Generally, smart frame 100 may be configured to accommodate standard and/or other commonly used vehicle registration plates. In at least some cases, smart frame 100 may have a generally rectangular (e.g., box-like) shape, and interfacing of portions 102, 104 may provide an interior space where the vehicle registration plate may be physically situated while remaining visible for inspection.

As will be appreciated in light of this disclosure, it may be desirable, at least in some instances, to construct portions 102, 104 to be durable and reusable. As will be further appreciated, it may be desirable to construct electronics housing portion 104 (which may at least partially house electronics assembly 200) such that it is substantially impervious to water, dust, and other environmental hazards which could affect the performance and integrity of electronics assembly 200. To such ends, portions 102, 104 may be constructed from any of a wide range of suitable materials, including plastic(s), rubber(s), composite material(s), and/or metal(s) (including alloys), among others. In some cases, portions 102, 104 may be constructed, for example, from a high-impact plastic or composite material. In at least some cases, a liquid-tight sealing of electronics housing portion 104 may be provided through use of gaskets, O-rings, sealing compound(s), or the like.

Figure 5:
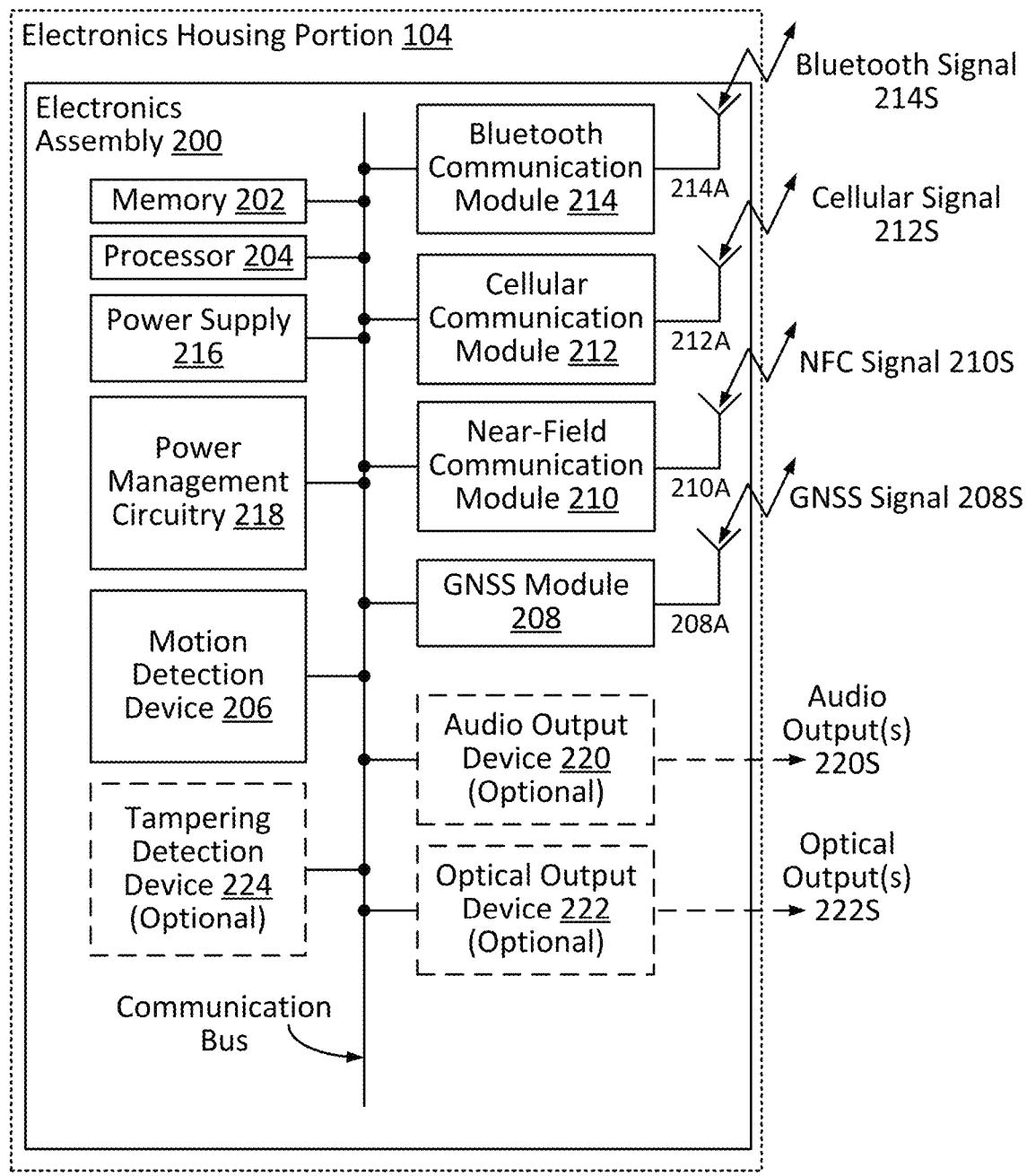
FIG. 5 is a block diagram illustrating an electronics assembly configured in accordance with an embodiment of the present disclosure.

As previously noted, smart frame 100 may include an electronics assembly 200. Electronics assembly 200 may be configured, in accordance with some embodiments, for providing smart frame 100 with a variety of capabilities and controlling any (or all) of the various operations and functions associated with smart frame 100, as described herein. FIG. 5 is a block diagram illustrating an electronics assembly 200 configured in accordance with an embodiment of the present disclosure. In general, the specific constituent elements of electronics assembly 200 may be customized, as desired for a given target application or end-use. In accordance with some embodiments, any (or all) of the various components of electronics assembly 200 may communicate with one another via a communication bus or other suitable interconnect. Also, as will be appreciated in light of this disclosure, any (or all) of the various components of electronics assembly 200 may be populated on one or more printed circuit boards (PCBs) or other suitable intermediate(s) or substrate(s), in accordance with some embodiments. In some instances, a flexible, hinged, or articulated intermediate or substrate may be employed.

Electronics assembly 200 may include memory 202, which may be configured for use, for example, as program and/or data memory. Memory 202 may be implemented in any one, or combination, of volatile and non-volatile memory and may be of any type and size, as desired for a given target application or end-use. In some cases, memory 202 may be configured for use in storing data, on a temporary or permanent basis, whether that data is native to smart frame 100 or received from another source (e.g., such as database server 1008, discussed below). Generally, memory 202 may be configured for use as processor workspace for processor(s) 204 (discussed below).

In accordance with some embodiments, memory 202 may be (or otherwise may include) a computer-readable medium that, when executed by a processor (e.g., such as a given processor 204), carries out (in part or in whole) any one or more of the operations and functions described herein. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and one or more embedded routines for carrying out device functionality. In a more general sense, memory 202 may be implemented in hardware, software, firmware, or a combination thereof, as desired for a given target application or end-use.

Electronics assembly 200 also may include one or more processors 204 configured to perform or otherwise facilitate a given operation or function associated with electronics assembly 200 (or smart frame 100 more generally). To that end, a given processor 204 may be, for example, a central processing unit (CPU), a microcontroller unit (MCU), or any other suitable processing element, as will be apparent in light of this disclosure. Moreover, a given processor 204 may be configured to communicate with any one (or combination) of the other various electronic components of electronics assembly 200 via a communication bus, a serial interface, one or more control signals, or other suitable interconnection means. Additionally, a given processor 204 may be configured to access data stored at memory 202 or otherwise accessible to smart frame 100 (e.g., from database server 1008, discussed below).

As will be appreciated in light of this disclosure, it may be desirable, at least in some instances, to ensure that a given processor 204 is configured to minimize or otherwise reduce its power consumption in effort to conserve power supply 216 (discussed below). To that end, a given processor 204 may be, at least in some embodiments, a low-power processing element having a nominal operating voltage. In accordance with some embodiments, a given processor 204 may be configured to remain in a low-power state (e.g., a sleep state, hibernation state, or off state) until it is woken up, which may occur periodically (e.g., after a predetermined time interval has elapsed) or upon receipt of a given interrupt or wake-up signal from some other constituent element of electronics assembly 200 (e.g., such as a wake-up signal from motion detection device 206, discussed below).

Electronics assembly 200 further may include a motion detection device 206 configured to detect movement and/or a change in physical orientation of smart frame 100. To such ends, motion detection device 206 may be (or otherwise may include) a micro-electromechanical system (MEMS) accelerometer device, an infrared (IR) sensor, or any other suitable movement detection device, as will be apparent in light of this disclosure. In accordance with some embodiments, motion detection device 206 may be configured to output a wake-up signal to a given processor 204 in response to its activation as caused by a detected movement and/or a detected change in physical orientation of smart frame 100. In response to receipt of this wake-up signal, a given processor 204 may transition out of a low-power state (e.g., a sleep state, hibernation state, or off state) and send a signal (e.g., a wake-up signal and/or a control signal) to any (or all) of modules 208, 210, 212, 214 (each discussed below) and instruct such element to receive or transmit, as the case may be, a corresponding signal 208S, 210S, 212S, 214S (each discussed below). In this manner, a given processor 204 (and smart frame 100 more generally) may remain in a low-power state until motion detection device 206 is activated, in accordance with some embodiments. In accordance with some embodiments, there may be multiple processors 204, each handling different task(s) with direct signaling between them using a serial link and/or status and control signal(s).

As can be seen further from FIG. 5, electronics assembly 200 may include a global navigational satellite system (GNSS) module 208 and corresponding GNSS antenna 208A configured to receive GNSS signal(s) 208S. Module 208 may be configured to receive a GNSS signal 208S from any one (or combination) of the Global Positioning System (GPS) of the United States, the Galileo Navigation Satellite System of the European Union, the Global Navigation Satellite System (GLONASS) of Russia, or the BeiDou Navigation Satellite System of China, among others. In accordance with some embodiments, module 208 may be configured for use in determining a geographical location of smart frame 100, in some instances utilizing geofencing. In accordance with some embodiments, longitude and latitude coordinates may be received via GNSS signal 208S for relaying by smart frame 100. Reception of a given GNSS signal 208S may be provided continuously, periodically (e.g., at fixed or variable intervals), on-demand, or otherwise as desired. Antenna 208A may be situated, in part or in whole, within electronics housing portion 104. In some embodiments, antenna 208A may be, for example, a PCB antenna configured as typically done or any other suitable GNSS antenna configuration, as will be apparent in light of this disclosure.

Figure 6:
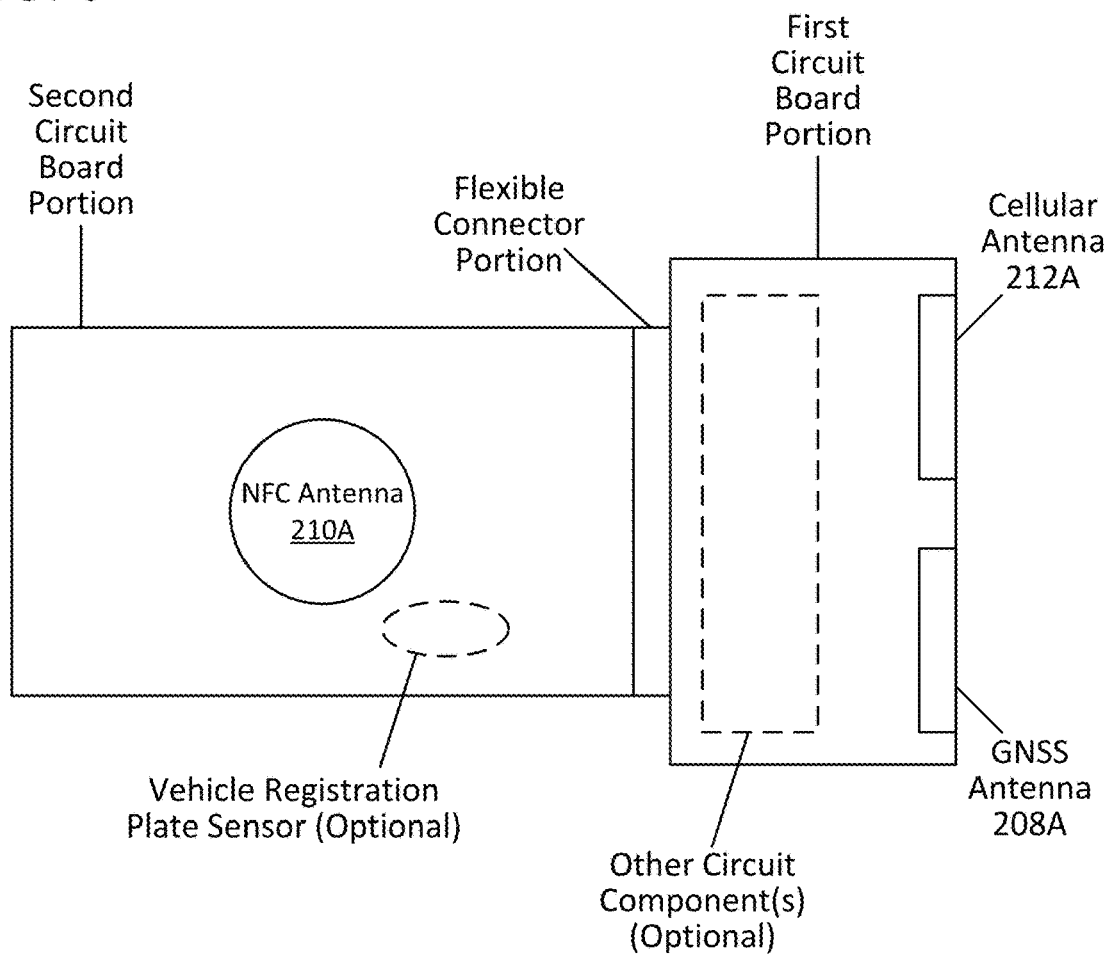
FIG. 6 is a plan view of an assembly configured in accordance with an embodiment of the present disclosure.
Figure 7:
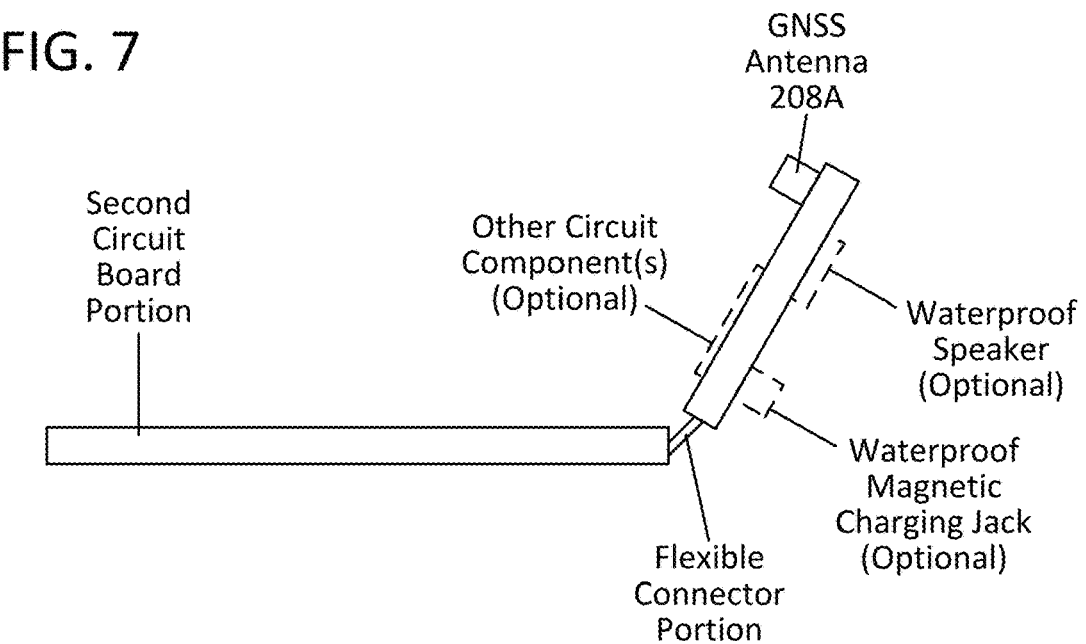
FIG. 7 is a side elevation view of the assembly of FIG. 6.

As will be appreciated in light of this disclosure, the proximity of metal surfaces to GNSS antenna 208A and/or cellular antenna 212A can negatively impact antenna performance. As such, it may be desirable, at least in some instances, to position antennas 208A, 212A sufficiently far away from metal surface(s) of the host vehicle and (as relevant) the metal body of the vehicle registration plate to eliminate or otherwise reduce interference with GNSS signal 208S and/or cellular signal 212S. To that end, antennas 208A, 212A may be mounted at an angle at an end of electronics housing portion 104 (e.g., as generally can be seen in FIG. 1), in accordance with some embodiments. See also FIGS. 6-7, discussed below.

As will be further appreciated in light of this disclosure, it generally may be important to provide adequate solid ground plane reference for antennas 208A and/or 212A. In the case of cellular antenna 212A, for instance, the size of the ground plane may be, at least in some cases, on the order of 100 mm$^2$ or more, depending on applicable performance requirements. To provide a ground plane area of sufficient size, it may be desirable, at least in some instances, to construct an assembly including GNSS antenna 208A and cellular antenna 212A like that shown in FIGS. 6-7, which illustrate several views of an assembly configured in accordance with an embodiment of the present disclosure. As can be seen, the assembly may include, for example, two or more separate and distinct rigid circuit board portions that are physically (and optionally electrically) connected with one another by one or more intervening flexible portions, in accordance with some embodiments. As can be seen further, GNSS antenna 208A and cellular antenna 212A may be disposed on a first, smaller circuit board portion (or other suitable intermediate or substrate), whereas NFC antenna 210A may be disposed on a second, larger circuit board portion (or other suitable intermediate or substrate). When electronics assembly 200 includes an assembly of this construction, the smaller circuit board portion having antennas 208A, 212A may be positioned, for instance, to extend beyond an end of electronics housing portion 104 and angled away from nearby metal surface(s)/bodies, whereas the ground plane referencing cellular antenna 212A may continue through the flexible connector portion to the larger circuit board mounted within electronics housing portion 104, in accordance with some embodiments. As previously discussed with general reference to electronics assembly 200, flexible, hinged, or articulated PCBs or other intermediates or substrates may be employed, and this also may be true of this assembly (inclusive of the flexible connector portion), in accordance with some embodiments. In some cases, the assembly optionally may include one or more other circuit components, such as, for example, a vehicle registration plate sensor, a waterproof speaker, and/or a waterproof charging jack/port (which optionally may be magnetic). Other suitable componentry for inclusion as part of the noted assembly will depend on a given target application or end-use and will be apparent in light of this disclosure.

Also, as can be seen from FIG. 5, electronics assembly 200 may include a near-field communication (NFC) module 210 and corresponding NFC antenna 210A configured to transmit and/or receive NFC signal(s) 210S. Module 210 may be configured, in accordance with some embodiments, to wirelessly communicate (e.g., with a given NFC tag 110 within range) via one or more NFC protocols. To such ends, module 210 may be a dedicated one-way or two-way NFC reader device. Communication via NFC signal 210S may be provided continuously, periodically (e.g., at fixed or variable intervals), on-demand, or otherwise as desired. Antenna 210A may be situated, in part or in whole, within electronics housing portion 104. In some embodiments, antenna 210A may be, for example, a PCB antenna configured as typically done or any other suitable NFC antenna configuration, as will be apparent in light of this disclosure. In at least some cases, NFC antenna 210A may be situated on a given exterior surface of electronics housing portion 104 (and, optionally, an exterior surface of frame portion 102). In an example case, NFC antenna 210A may be configured as a loop antenna.

In accordance with some embodiments, NFC module 210 may be configured to detect a nearby NFC tag 110 hosted by a given vehicle, for instance, when smart frame 100 is interfaced with (e.g., mounted on) said vehicle near said NFC tag 10. In this manner, NFC module 210 and NFC tag 10 may wirelessly communicate with one another via the exchange of one or more NFC signals 210S. In accordance with some embodiments, smart frame 100 may be configured to have NFC module 210 attempt to read a nearby NFC tag 10, for instance, when smart frame 100 is determined (e.g., by motion detection device 206) to be physically oriented substantially vertically but not substantially horizontally. In accordance with some embodiments, NFC module 210 may be configured to generate a loss of signal indication from NFC tag 10 to trigger an alarm or alert status indicating a removal of smart frame 100 from the vehicle hosting said NFC tag 10.

As can be seen further from FIG. 5, electronics assembly 200 may include a cellular communication module 212 and corresponding cellular antenna 212A configured to transmit and/or receive cellular signal(s) 212S. In some cases, module 212 may be a dedicated cellular receiver device provided only with receiving capabilities, whereas in other cases, module 212 may be a cellular transceiver device provided with both transmitting and receiving capabilities. Transmission of a given cellular signal 212S may be provided continuously, periodically (e.g., at fixed or variable intervals), on-demand, or otherwise as desired. Moreover, the repetition rate and transmission power at which cellular signal 212S is transmitted may be varied, as desired for a given target application or end-use. Antenna 212A may be situated, in part or in whole, within electronics housing portion 104. In some embodiments, antenna 212A may be, for example, a PCB antenna configured as typically done or any other suitable cellular antenna configuration, as will be apparent in light of this disclosure.

In accordance with some embodiments, module 212 may be configured to wirelessly communicate with a given device (e.g., database server 1008, discussed below) via one or more cellular communication protocols, such as a low-power wide-area network (LPWAN) communication protocol. In some cases, module 212 may be configured according to any one (or combination) of long-term evolution machine type communication protocol(s), narrowband Internet of things (NB-IoT) communication protocol(s), and long-range wide-area network (LoRaWAN) communication protocol(s). Module 212 may be, for example, an active cellular modem or other cellular-compatible device, such as an LTE CatM cellular modem configured to communicate over an LTE-CatM1 network or an LTE-1 or LTE-4 cellular modem. In at least some instances, in support of such cellular capabilities, electronics assembly 200 optionally further may include a subscriber identification module (SIM) card socket or comparable device.

As can be seen further from FIG. 5, electronics assembly 200 may include a Bluetooth communication module 214 and corresponding Bluetooth antenna 214A configured to transmit and/or receive Bluetooth signal(s) 214S. In some cases, module 214 may be a dedicated Bluetooth receiver device provided only with receiving capabilities, whereas in other cases, module 214 may be a Bluetooth transceiver device provided with both transmitting and receiving capabilities. Transmission of a given Bluetooth signal 214S may be provided continuously, periodically (e.g., at fixed or variable intervals), on-demand, or otherwise as desired. Moreover, the repetition rate and transmission power at which Bluetooth signal 214S is transmitted may be varied, as desired for a given target application or end-use. Antenna 214A may be situated, in part or in whole, within electronics housing portion 104. In some embodiments, antenna 214A may be, for example, a printed circuit board (PCB) antenna configured as typically done or any other suitable Bluetooth antenna configuration, as will be apparent in light of this disclosure.

In accordance with some embodiments, module 214 may be configured to wirelessly communicate (e.g., with a first computing device 1002, discussed below) via one or more Bluetooth communication protocols, such as a Bluetooth Low Energy (BLE) protocol. In accordance with some embodiments, module 214 may be configured to transmit one or more Bluetooth advertising beacons, which may be utilized in locating smart frame 100 within a given space, for instance, using a first computing device 1002 (discussed below). In accordance with some embodiments, module 214 may be configured to receive one or more Bluetooth beacons from a fixed Bluetooth location to provide proximity location information relevant to smart frame 100. In at least some cases, provision of localization information via a Bluetooth beacon may facilitate a user in locating smart frame 100, for example, in areas where GNSS signals may be difficult to receive, such as indoors.

Electronics assembly 200 additionally may include (or otherwise be configured to connect with) a power supply 216 configured to supply a given target amount of power to any of the various components of electronics assembly 200 (or smart frame 100 more generally). Power supply 216 may be a direct current (DC) power supply, such as a battery, which may be permanent or replaceable and of a given cell size or capacity and type (e.g., alkaline, lithium ion, etc.). In an example case, power supply 216 may be (or otherwise may include) a lithium-ion polymer (LiPo) battery (e.g., a 3.7-V LiPo battery). In some instances, power supply 216 may be (or otherwise may include) one or more rechargeable batteries. In some cases, power supply 216 may be a battery configured to power electronics assembly 200, for example, for two months or more without need of replacement or recharging.

In some cases, power supply 216 may include or be operatively coupled with a photovoltaic module (e.g., a solar cell) configured to convert light energy to electrical energy for use by electronics assembly 200. In some such instances, the photovoltaic module may be configured to charge any batteries utilized as (or in conjunction with) power supply 216.

In addition, as can be seen from FIG. 5, electronics assembly 200 optionally further may include power management circuitry 218, which may be connected with power supply 216 and/or other electronic component(s) of electronics assembly 200. In some cases, power management circuitry 218 may include one or more voltage regulator circuits configured to regulate the power in providing the operating voltage for a given processor 204 (and/or other constituent elements of electronics assembly 200). In some cases, power management circuitry 218 may include one or more battery charging circuits configured to facilitate charging of power supply 216 (e.g., through optional photovoltaics or otherwise).

As will be appreciated in light of this disclosure, it may be desirable, at least in some instances, to ensure that any (or all) of modules 208, 210, 212, 214 is configured to minimize or otherwise reduce its power consumption in effort to conserve power supply 216. To that end, a given module 208, 210, 212, 214 may be, at least in some embodiments, a low-power wireless communication element having a nominal operating voltage. In accordance with some embodiments, a given module 208, 210, 212, 214 may be configured to remain in a low-power state (e.g., a sleep state, hibernation state, or off state) until it is woken up, which may occur periodically (e.g., after a predetermined time interval has elapsed) or upon receipt of a given interrupt or wake-up signal from some other constituent element of electronics assembly 200 (e.g., such as a wake-up signal from a given processor 204 or motion detection device 206).

In some embodiments, electronics assembly 200 optionally may include an audio output device 220, which may be a speaker, beeper, or any other device capable of emitting sound of a given frequency, optionally with a given emission period or pattern. In accordance with some embodiments, audio output device 220 may be configured to output audio output signal(s) 220S indicative of a given condition with respect to the location and/or operation of smart frame 100. For instance, in some cases, audio output device 220 may emit a sound which may assist in searching for and physically locating smart frame 100 (and an attendant host vehicle, if any). In some cases, audio output device 220 may emit a sound indicative of a low power level of power supply 216. In some cases, audio output device 220 may emit a sound indicative of detected tampering with smart frame 100 or unauthorized removal of a vehicle registration plate from smart frame 100.

Additionally (or alternatively), electronics assembly 200 optionally may include one or more optical output devices 222, which may include one or more solid-state light sources, such as a light-emitting diode (LED), or any other device capable of emitting light of a given wavelength, optionally with a given emission period or pattern. In accordance with some embodiments, a given optical output device 222 may be configured to output optical output signal(s) 222S indicative of a given condition with respect to the location and/or operation of smart frame 100. For instance, a given optical output device 222 may be configured to emit light indicative of any one (or combination) of the same various example conditions discussed above with respect to audio output device 220, in accordance with some embodiments.

When included, a given optional output device 220, 222 may be configured, in accordance with some embodiments, to provide an associated output 220S, 222S based on, for example, instruction received from a given processor 204 (e.g., upon receipt of a given signal 208S, 210S, 212S, 214S by electronics assembly 200). For instance, a given device 220, 222 may be activated when (1) NFC module 210 detects the presence of an NFC tag 10 mounted to a vehicle, (2) cellular communication module 212 receives a cellular signal 212S (e.g., an alarm or alert status) from database server 1008 (discussed below), (3) Bluetooth communication module 214 receives a Bluetooth signal 214S from a first computing device 1002 (discussed below) to locate smart frame 100 within a given space, or (4) tampering detection device 224 (discussed below) detects tampering with smart frame 100 or unauthorized removal of a vehicle registration plate from smart frame 100. Numerous other possibilities will be apparent in light of this disclosure.

In accordance with some embodiments, electronics assembly 200 optionally may include a tampering detection device 224 configured to detect tampering with smart frame 100 or unauthorized removal of a vehicle registration plate from smart frame 100. Device 224 may be configured to utilize any one (or combination) of inductive, magnetic, capacitive, electrical, and optical sensing techniques, among others, in monitoring the integrity of smart frame 100, its retention of a vehicle registration plate, and its mounting on a vehicle.

As noted above, processor(s) 204 may be involved with performing (or instructing another element to perform) a given operation or function associated with electronics assembly 200 (or smart frame 100 more generally). For instance, a given processor 204 may be configured to output a signal (e.g., a wake-up signal and/or a control signal) to any of modules 208, 210, 212, 214 to effectuate reception and/or transmission of a given corresponding signal 208S, 210S, 212S, 214S, in accordance with some embodiments. A given processor 204 may be configured to output a signal (e.g., a wake-up signal and/or a control signal) to a given optional output device 220, 222 to effectuate emission of a given corresponding output 220S, 222S, in accordance with some embodiments. A given processor 204 may be configured to output a signal to power supply 216 to check the power level thereof or to power management circuitry 218 to adjust an applied power management profile or scheme, in accordance with some embodiments.

In accordance with some embodiments, one or more alarms or alert statuses may be triggered by a given processor 204 (or other suitable component of electronics assembly 200) on any of a wide range of conditions. For instance, an alarm or alert status may be triggered (1) if tampering detection device 224 detects tampering with smart frame 100 or unauthorized removal of a vehicle registration plate from smart frame 100, (2) if a vehicle hosting smart frame 100 has exceeded the legal speed limit, performed an illegal traffic maneuver, or entered a restricted area, (3) if a vehicle hosting smart frame 100 has exceeded a permissible driving time window (e.g., exceeded the time limit for a demonstration/test drive scenario, exceeded the time limit for hours of service in a commercial driving scenario, etc.), (4) if the power level of power supply 216 is below a given threshold, (5) if smart frame 100 or NFC tag 10 is damaged, or (6) to facilitate locating of smart frame 100 within a given space (e.g., mounted to a given vehicle, sitting on a desk or in inventory, etc.). The duration and type of alarm or alert status may be customized, as desired for a given target application or end-use, and in some instances, may be configurable in software to meet user requirements. In accordance with some embodiments, registration information stored at database server 1008 may be utilized, for example, in providing an alert warning a user of the expiration of the registration of a plate.

Also, as will be appreciated in light of this disclosure, a given sub-group or combination of components of electronics assembly 200 may be integrated or otherwise combined with one another as a single element (e.g., a single circuit or chip) configured to serve their multiple respective functions, in accordance with some embodiments. For instance, in some cases, one or more of memory 202, processor(s) 204, GNSS module 208, NFC module 210, cellular communication module 212, and Bluetooth module 214 may be integrated together. In a specific example case, memory 202, one or more processors 204, GNSS module 208, and cellular communication module 212 may be integrated into a singular, core device of electronics assembly 200. In another specific example case, Bluetooth communication module 214 may include one or more integrated processors 204 and associated memory 202. Other suitable combinations and integrations of the various constituent components of electronics assembly 200 will be apparent in light of this disclosure.

System Architecture and Operation

Figure 8:
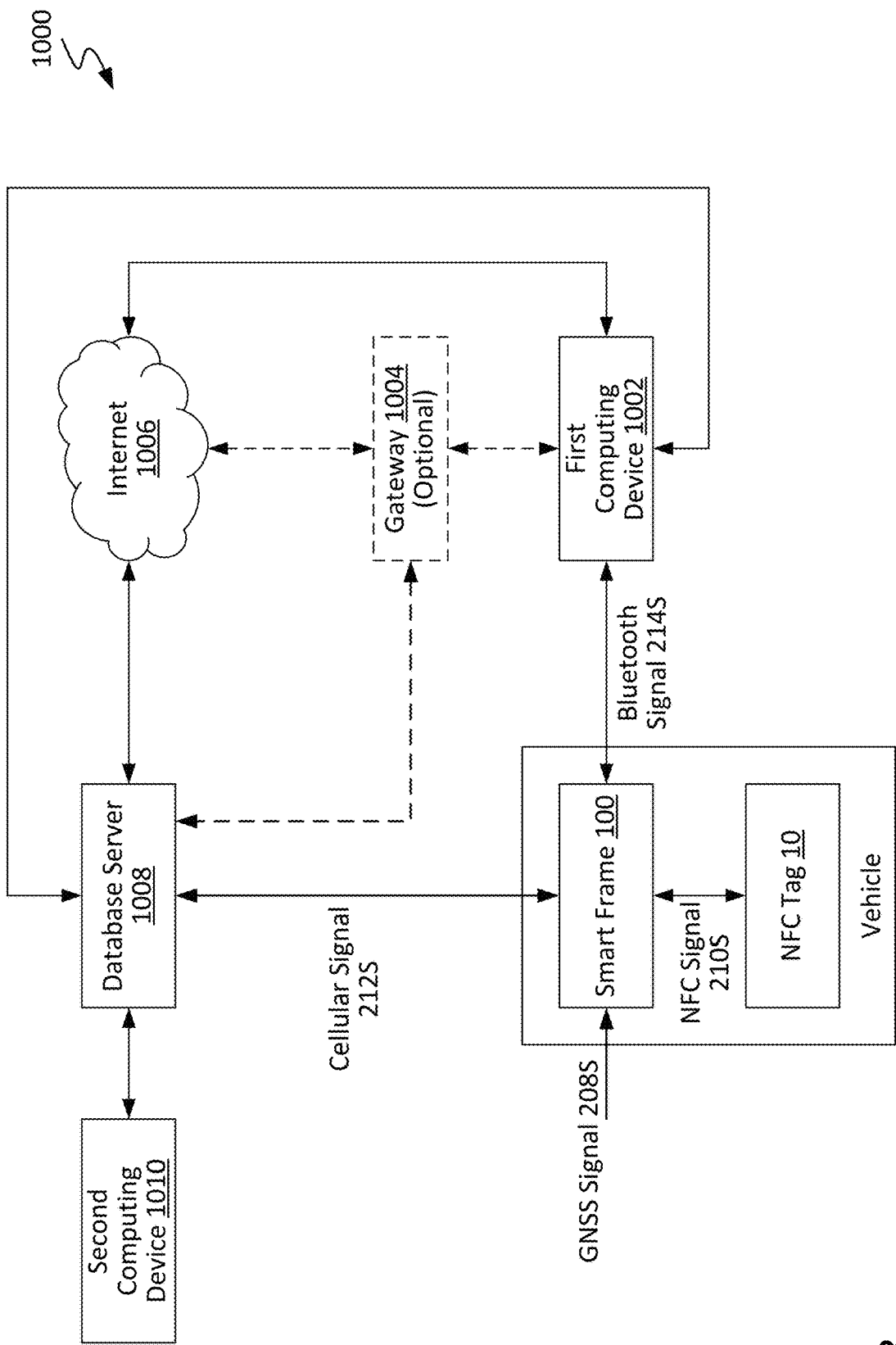
FIG. 8 illustrates a system configured in accordance with an embodiment of the present disclosure.

FIG. 8 illustrates a system 1000 configured in accordance with an embodiment of the present disclosure. As can be seen, system 1000 may include an NFC tag 10 and a smart frame 100 hosted by a given vehicle. Moreover, in accordance with some embodiments, system 1000 may involve in its operation a first computing device 1002, a gateway 1004, the internet 1006, a database server 1008, and a second computing device 1010. Each of these various elements is discussed in turn below. More generally, FIG. 8 illustrates communicative coupling of the various constituent elements of system 1000 and the overall flow of data within system 1000, in accordance with some embodiments.

As previously noted, smart frame 100 may be configured to read a nearby NFC tag 10 hosted by a vehicle. In operation of smart frame 100 (and system 1000 more generally), smart frame 100 may be positioned proximate to (e.g., mounted directly over) NFC tag 10 such that NFC tag 10 is sandwiched between electronics housing portion 104 and the intended surface for mounting smart frame 100 on vehicle. In this manner, NFC module 210 (of electronics assembly 200) may become situated within range of NFC tag 10 to allow wireless communication therebetween. Through such communication, smart frame 100 may receive data pertaining to NFC tag 10 which, when relayed to database server 1008 and compared with data stored thereat, may allow a user to determine on which vehicle smart frame 100 is mounted at a given time.

NFC tag 10 may be configured, in accordance with some embodiments, to be mounted to the exterior of a vehicle in a temporary, semi-permanent, or other desired manner. For instance, consider FIG. 4, which illustrates an example mounting arrangement of NFC tag 10 and smart frame 100 on a vehicle in accordance with an embodiment of the present disclosure. As can be seen, NFC tag 10 may be mounted, for example, in a rear area of the vehicle typically utilized for vehicle registration plate mounting, though mounting in a similar front area of the vehicle also is envisioned. NFC tag 10 may be mounted on the vehicle, for example, when it is first received as new inventory, and in some cases may remain so mounted even after delivery of the vehicle to a customer, as NFC tag 10 may be hidden from view while smart frame 100 is mounted on the vehicle. In accordance with some embodiments, NFC tag 10 may be a sticker, decal, or other adhesively applied element, providing a low-cost, small-sized solution for NFC with smart frame 100. In some cases, NFC tag 10 may have at least one dimension (e.g., width or diameter) in the range of about 25-40 mm (±5 mm). In accordance with some embodiments, NFC tag 10 may include a layer (e.g., a ferrous layer or other suitable layer) which permits the coil of NFC tag 10 to operate when mounted on metal (e.g., such as might occur in mounting NFC tag 10 to the exterior of a vehicle).

In accordance with some embodiments, NFC tag 10 may be printed with a barcode, such as a linear barcode or quick response (QR) code, representing its identification (ID) code. When NFC tag 10 is first attached to a given host vehicle, its ID code and the vehicle identification number (VIN) of the host vehicle may be scanned (e.g., via a barcode reader associated with first computing device 1002 or other suitable device). The ID code (of NFC tag 10) and the VIN (of the vehicle) then may be saved, for example, on database server 1008 and, in this manner, may be registered as being associated with one another. Thus, this association of a given NFC tag 10 with a given vehicle may be stored by database server 1008 and accessible by a given computing device 1002, 1010 (e.g., through an internet browser or software application) to view the location of smart frame 100 (and an attendant vehicle, if any).

As noted above, system 1000 may involve use of a first computing device 1002, mobile or otherwise, in accordance with some embodiments. First computing device 1002 may be any one (or combination) of a laptop/notebook computer, a sub-notebook computer, a tablet computer, a desktop computer, a mobile phone, a smartphone, a personal digital assistant (PDA), a cellular handset, a television set, a computer monitor, a media streaming device, and a video conferencing system, among other options. In accordance with some embodiments, first computing device 1002 may be configured for wireless communication with Bluetooth communication module 214 of smart frame 100 utilizing Bluetooth signal(s) 214S. In accordance with some embodiments, first computing device 1002 may host a browser or other software application configured to facilitate review of information pertinent to NFC tag 10, smart frame 100, and/or any part or the totality of system 1000 and its various constituent elements.

In accordance with some embodiments, first computing device 1002 may be configured for monitoring and/or analyzing the operation of one or more of smart frame 100 and NFC tag 10. In some cases, first computing device 1002 may be a dedicated reader device configured specifically to such ends, whereas in some other cases, first computing device 1002 may be a general computing device configured for use to such ends, optionally hosting an application to facilitate its use in monitoring and/or analyzing smart frame 100 and/or NFC tag 10. First computing device 1002 may be configured, in accordance with some embodiments, to access database server 1008 (discussed below) to display current and/or previous data pertaining to smart frame 100 and NFC tag 10, including data obtained by smart frame 100 from communicating with (e.g., reading) NFC tag 10.

In accordance with some embodiments, first computing device 1002 may be configured to receive data from smart frame 100 upon receipt of a successfully secure pairing handshake. As will be appreciated in light of this disclosure, this handshake may include, for example, a request for a Bluetooth LE (or other suitable) connection to smart frame 100. Once the connection is confirmed, smart frame 100 may request an encrypted password. If the encrypted password is correct, smart frame 100 may issue a standard Bluetooth (or other) pairing request, which the originating first computing device 1002 can accept, and then two-way inspection and/or update to smart frame 100 can continue.

In accordance with some embodiments, system 1000 optionally may involve use of one or more gateways 1004 configured to receive data gathered from smart frame 100 by first computing device 1002 and transmit that data to a database server 1008 (discussed below) directly or indirectly (e.g., via the internet 1006). To such ends, a given optional gateway 1004 may be configured to utilize any one or combination of suitable communication protocols, wired or wireless, such as, for example, Ethernet, Wi-Fi, Bluetooth, and cellular, among others. In accordance with some embodiments, gateway 1004 may be any one (or combination) of fixed Bluetooth-to-Wi-Fi, cellular-to-Wi-Fi, or cellular-to-Bluetooth bridge/hub devices. Gateway 1004 may be used to read signal(s) from first computing device 1002 within range and to forward information over a network interface to internet 1006 and database server 1008.

In accordance with some embodiments, first computing device 1002 may transmit signal(s) including, for example, data obtained by smart frame 100 from (1) received GNSS signal(s) 208S, (2) NFC signal(s) 210S exchanged in communications with NFC tag 10, (3) cellular signal(s) 212S exchanged in communications with database server 1008, (4) Bluetooth signal(s) 214S exchanged in communicating with first computing device 1002, a Bluetooth-compatible key fob or dongle, and/or in-vehicle Bluetooth componentry. In some cases, data pertaining to the condition and operation of smart frame 100 (e.g., such as the current power level of power supply 216 or detected tampering with smart frame 100 or unauthorized removal of a vehicle registration plate from smart frame 100) also may be transmitted. When present, gateway 1004 may be configured to receive such signal(s) and relay data obtained therefrom to database server 1008 (optionally through the internet 1006). In this manner, a mechanism may be provided by which the status and location of smart frame 100 and NFC tag 10 (as well as any attendant vehicle) may be determined, monitored, and analyzed in operation of system 1000.

In accordance with some embodiments, system 1000 may involve use of a database server 1008, which may be accessible through the internet 1006 and, in some cases, may be cloud-based, in part or in whole. As will be appreciated in light of this disclosure, smart frame 100 may communicate with database server 1008 either directly or through one or more intervening elements (e.g., such as a cellular base station and/or a cellular network provider, if present).

As a means of data storage, database server 1008 may be configured to store information saved thereat, for instance, by smart frame 100, first computing device 1002, and/or second computing device 1010 (discussed below). In accordance with some embodiments, database server 1008 may store information about smart frame 100, NFC tag 10, and/or an associated vehicle, which may be retrieved by first computing device 1002 and/or second computing device 1010, for example. In accordance with some embodiments, the identification (ID) and/or vehicle identification number (VIN) of the vehicle associated with NFC tag 10 may be stored on database server 1008 and retrieved therefrom by first computing device 1002 and/or second computing device 1010 (discussed below).

In accordance with some embodiments, database server 1008 may be configured to verify that the various constituent elements of system 1000 are working properly. For instance, database server 1008 may be used, in accordance with some embodiments, to monitor the operating status of smart frame 100 and/or NFC tag 10. In a more general sense, database server 1008 may allow for a given desired degree of internetworking of the components of system 1000 and other elements as part of the internet of things (IoT), in accordance with some embodiments.

In accordance with some embodiments, system 1000 further may involve use of a second computing device 1010, mobile or otherwise. As will be appreciated in light of this disclosure, the description provided above with respect to the configurations and capabilities of first computing device 1002 also may apply equally here, in part or in whole, with respect to second computing device 1010, in accordance with some embodiments. In some cases, second computing device 1010 and first computing device 1002 may be the same device.

In accordance with some embodiments, second computing device 1010 may be configured for monitoring and/or analyzing data retrieved from the internet 1006 and/or database server 1008 (e.g., data obtained from smart frame 100 and/or NFC tag 10). In some cases, second computing device 1010 may be a dedicated reader device configured specifically to such ends, whereas in some other cases, second computing device 1010 may be a general computing device configured for use to such ends, optionally hosting an application to facilitate its use in such monitoring and/or analyzing. Second computing device 1010 may be configured, in accordance with some embodiments, to access database server 1008 to display current and/or previous data pertaining to smart frame 100 and/or NFC tag 10, including data obtained by smart frame 100 from NFC tag 10.

In accordance with some embodiments, second computing device 1010 may be configured to present data to a user or other intended audience. To that end, second computing device 1010 may have installed therein (or otherwise have access to) one or more suitable software applications, which may be device-specific or cloud-based in some instances.

In accordance with some embodiments, system 1000, inclusive of smart frame 100 and NFC tag 10, may be configured to provide a GNSS-based locating function by which smart frame 100 (and any attendant vehicle) may be located within a given geophysical space. More specifically, database server 1008 may establish cellular communication with smart frame 100 (via cellular communication module 212 thereof) to obtain, for instance, location, detected movement, detected speed, vehicle VIN, NFC tag 10 ID code, power supply 216 level, or other desired information. In accordance with some embodiments, a user may review any such information at computing device 1002, 1010 to determine where smart frame 100 currently is located, as well as its operational status. In this manner, GNSS module 208 may be utilized to wirelessly determine the current location of smart frame 100, for example, while it is interfaced with a host vehicle. In accordance with some embodiments, smart frame 100 may be configured to have GNSS module 208 read the current location of smart frame 100 when smart frame 100 is determined (e.g., by motion detection device 206) to be in motion but not when it is stationary.

In accordance with some embodiments, system 1000, inclusive of smart frame 100 and NFC tag 10, may be configured to provide a Bluetooth-based locating function by which smart frame 100 (and any attendant vehicle) may be located within a given physical space. More specifically, a given computing device 1002, 1010 may establish Bluetooth communication with smart frame 100 (via Bluetooth communication module 214 thereof) to obtain, for instance, location, change of orientation, vehicle VIN, NFC tag 10 ID code, power supply 216 level, or other desired information. In accordance with some embodiments, a user may review any such information at computing device 1002, 1010 to determine where smart frame 100 currently is located, as well as its operational status. In this manner, a user may utilize the Bluetooth communication capabilities of smart frame 100 to facilitate the process of locating said smart frame 100, for instance, on a given host vehicle, on a shelf or in a bin within a warehouse, within an office space, etc.

In accordance with some embodiments, system 1000, inclusive of smart frame 100 and NFC tag 10, may be configured to provide an alarm or alert status function by which smart frame 100 (and any attendant vehicle) may be located within a given physical space. More specifically, (1) a given computing device 1002, 1010 may establish Bluetooth communication with smart frame 100 (via Bluetooth communication module 214 thereof) and/or (2) database server 1008 may establish cellular communication with smart frame 100 (via cellular communication module 212 thereof) to trigger audio output device 220 and/or optical output device 222 to output a corresponding output signal 220S, 222S which, when perceived by a user, may assist with physically locating smart frame 100 (and any attendant vehicle) in a given space.

Methodologies

Figure 9:
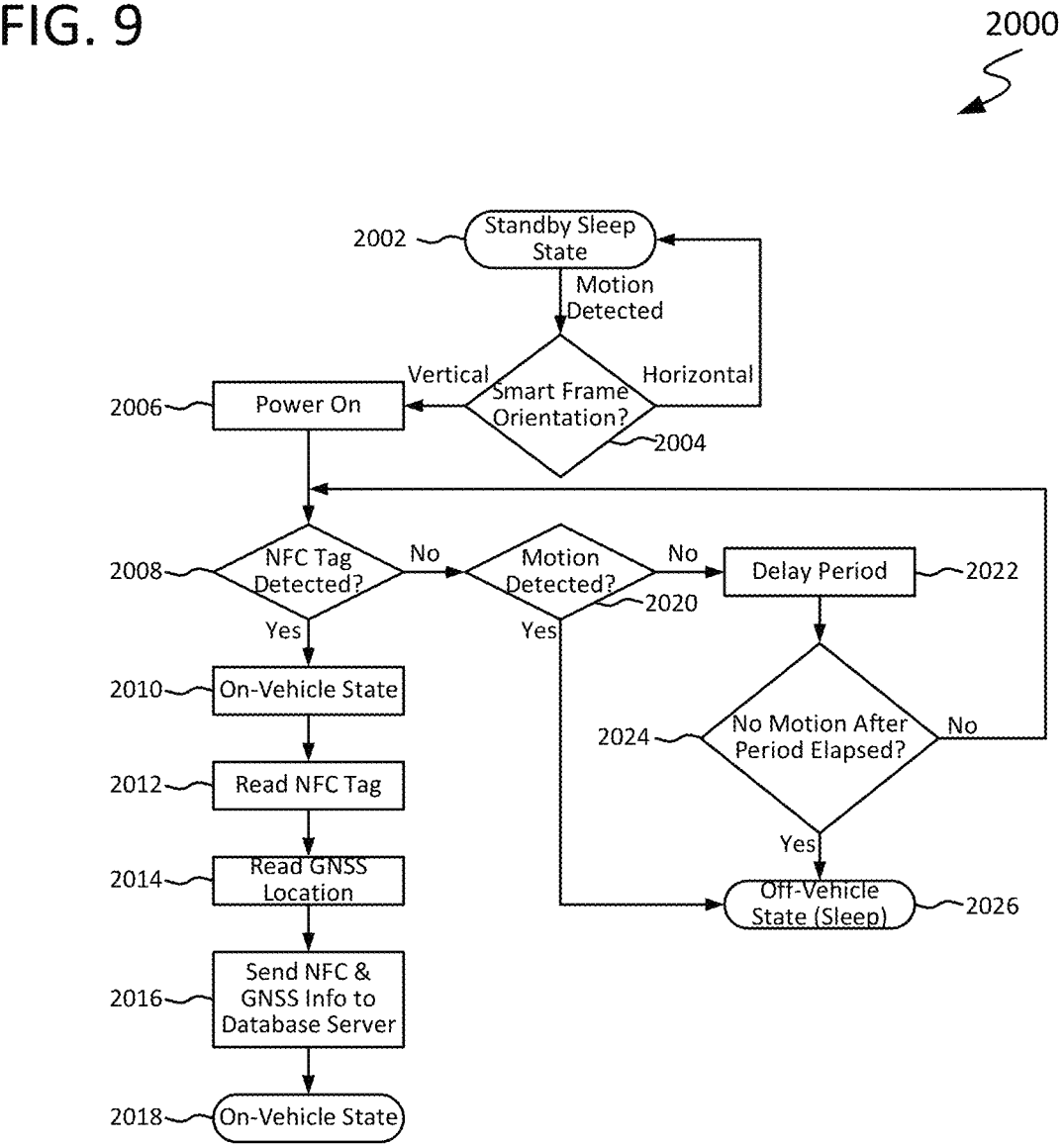
FIG. 9 is a flow diagram illustrating a method of using a smart frame, in accordance with an embodiment of the present disclosure.

FIG. 9 is a flow diagram illustrating a method 2000 of using a smart frame 100, in accordance with an embodiment of the present disclosure. As can be seen, method 2000 may begin as in block 2002 with smart frame 100 being in an initial standby sleep state. When motion is detected (e.g., by motion detection device 206), method 2000 may continue as in block 2004 with determining the current physical orientation of smart frame 100. If smart frame 100 is oriented substantially horizontally (e.g., as in a case where smart frame 100 is not mounted to a vehicle), method 2000 may return to block 2002 with smart frame 100 once again returning to a standby sleep state. If instead smart frame 100 is oriented substantially vertically (e.g., as in a case where smart frame 100 is mounted to a vehicle), method 2000 may continue as in block 2006 with a given processor 204 and NFC module 210 (or smart frame 100 more generally) powering on.

Method 2000 then may continue as in block 2008 with determining whether an NFC tag 10 is detected by smart frame 100. If no NFC tag 10 is within range of smart frame 100, method 2000 may continue as in block 2020 with determining whether smart frame 100 is in motion. If motion is detected, method 2000 may continue as in block 2026 with smart frame 100 transitioning to an off-vehicle state (e.g., sleep, standby, or other low-power state). If instead no motion is detected, method 2000 may continue as in block 2022 with smart frame 100 (e.g., a given processor 204 or other suitable timer) counting a delay period of a given length (e.g., on the order of seconds, minutes, or hours, as desired). After the delay period has elapsed, method 2000 may continue as in block 2024 with determining whether any further motion is detected. If no further motion is detected, method 2000 may continue as in block 2026 with smart frame 100 transitioning to an off-vehicle state (e.g., sleep, standby, or other low-power state). If instead further motion is detected, method 2000 may return to block 2008 with determining whether an NFC tag 10 is detected by smart frame 100 (as discussed above).

Returning to the determination made at block 2008, if instead an NFC tag 10 is within range of smart frame 100, method 2000 may continue as in block 2010 with smart frame 100 transitioning to an on-vehicle state. Then, method 2000 may continue as in block 2012 with reading NFC tag 10 (e.g., via NFC module 210) and as in block 2014 with reading the GNSS location (e.g., via GNSS module 208). Thereafter, method 2000 may continue as in block 2016 with sending the NFC and GNSS information to database server 1008. Method 2000 then may continue as in block 2018 with smart frame 100 transitioning to an on-vehicle state.

Figure 10:
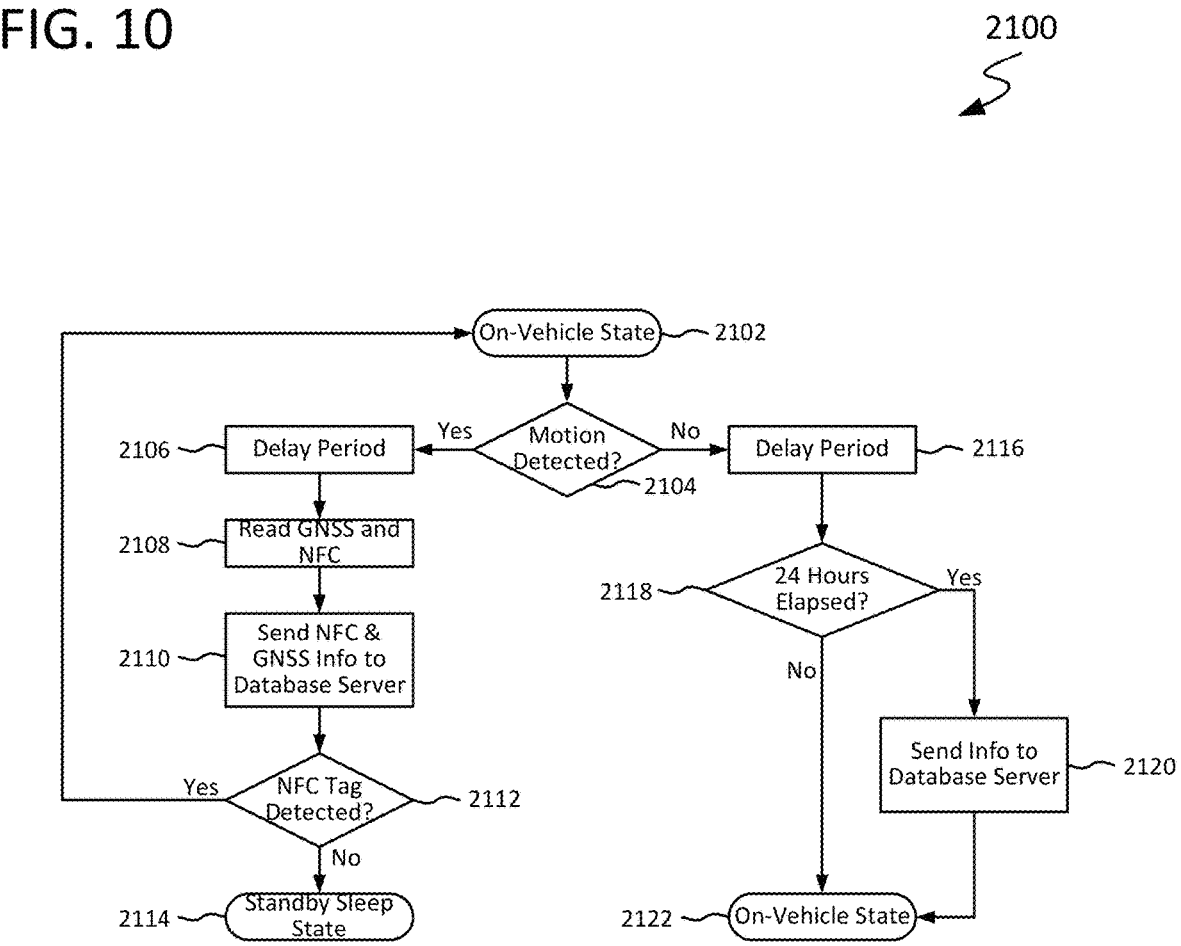
FIG. 10 is a flow diagram illustrating a method of using a smart frame, in accordance with an embodiment of the present disclosure.

FIG. 10 is a flow diagram illustrating a method 2100 of using a smart frame 100, in accordance with an embodiment of the present disclosure. As can be seen, method 2100 may begin as in block 2102 with smart frame 100 being in an initial on-vehicle state. Method 2100 may continue as in block 2104 with determining whether smart frame 100 is in motion (e.g., by motion detection device 206). If no motion is detected, method 2100 may continue as in block 2216 with smart frame 100 (e.g., a given processor 204 or other suitable timer) counting a delay period of a given length (e.g., on the order of seconds, minutes, or hours, as desired). Then, method 2100 may continue as in block 2118 with determining whether a 24-hour window (or other designated time window, as desired) has elapsed. If the designated time window has not yet elapsed, method 2100 may continue as in block 2122 with smart frame 100 remaining in an on-vehicle state. If instead the designated time window has elapsed, method 2100 may continue as in block 2120 with sending the ID code (of NFC tag 10) and VIN information (of the associated vehicle) to database server 1008 and then continue as in block 2122 with smart frame 100 remaining in an on-vehicle state.

Returning to the determination made at block 2104, if instead motion of smart frame 100 has been detected (e.g., by motion detection device 206), method 2100 may continue as in block 2106 with smart frame 100 (e.g., a given processor 204 or other suitable timer) counting a delay period of a given length (e.g., on the order of seconds, minutes, or hours, as desired). Then, method 2100 may continue as in block 2108 with reading NFC tag 10 (e.g., via NFC module 210) and reading the GNSS location (e.g., via GNSS module 208). Thereafter, method 2100 may continue as in block 2110 with sending the NFC and GNSS information to database server 1008.

Thereafter, method 2100 may continue as in block 2112 with determining whether an NFC tag 10 is (still) detected by smart frame 100. If no NFC tag 10 is within range of smart frame 100, method 2100 may continue as in block 2114 with smart frame 100 transitioning to a standby sleep state. In instead an NFC tag 10 is within range of smart frame 100, method 2100 may return to block 2102 with smart frame 100 remaining in an on-vehicle state.

FURTHER EXAMPLES

The following examples pertain to some further embodiments of the disclosure, from which numerous permutations and combinations will be apparent.

Example 1 is a smart frame for a vehicle registration plate. The smart frame includes an electronics assembly. The electronics assembly includes a global navigational satellite system (GNSS) module configured to receive a GNSS signal including data pertaining to a current geographic location of the smart frame. The electronics assembly also includes a cellular communication module configured to transmit a cellular signal including the data pertaining to the current geographic location of the smart frame. The electronics assembly further includes a motion detection device configured to detect motion of the smart frame and, in response to detection thereof, output a signal which results in the GNSS module activating to receive the GNSS signal.

Example 2 includes the subject matter of any of Examples 1 and 3-37, wherein the electronics assembly further includes a near-field communication (NFC) module configured to receive an NFC signal from an NFC tag hosted by a vehicle associated with the vehicle registration plate, the NFC signal including data pertaining to an identifier of the NFC tag.

Example 3 includes the subject matter of any of Examples 1-2 and 4-37, wherein the motion detection device is further configured to detect a change in physical orientation of the smart frame and, in response to detection thereof, output a signal which results in the NFC module activating to receive the NFC signal.

Example 4 includes the subject matter of any of Examples 1-3 and 5-37, wherein the signal is output by the motion detection device when the detected change in physical orientation is one from a substantially horizontal orientation of the smart frame to a substantially vertical orientation of the smart frame.

Example 5 includes the subject matter of any of Examples 1-4 and 6-37, wherein the cellular signal further includes data pertaining to the detected change in physical orientation of the smart frame.

Example 6 includes the subject matter of any of Examples 1-5 and 7-37, wherein the cellular signal further includes the data pertaining to the identifier of the NFC tag.

Example 7 includes the subject matter of any of Examples 1-6 and 8-37, wherein the identifier of the NFC tag includes an identification (ID) code of the NFC tag.

Example 8 includes the subject matter of any of Examples 1-7 and 9-37, wherein: the smart frame includes an electronics housing portion at least partially housing the electronics assembly; and the electronics assembly further includes an assembly including a GNSS antenna communicatively coupled with the GNSS module and a cellular antenna communicatively coupled with the cellular communication module, wherein the GNSS antenna and the cellular antenna extend beyond an end of the electronics housing portion.

Example 9 includes the subject matter of any of Examples 1-8 and 10-37, wherein the assembly is constructed from at least two rigid circuit board portions connected by at least one physically intervening flexible connector portion.

Example 10 includes the subject matter of any of Examples 1-9 and 11-37, wherein the data pertaining to the current geographic location of the smart frame includes latitude and longitude coordinates.

Example 11 includes the subject matter of any of Examples 1-10 and 12-37, wherein the data pertaining to the current geographic location of the smart frame includes geofencing information.

Example 12 includes the subject matter of any of Examples 1-11 and 13-37, wherein the data pertaining to the current geographic location of the smart frame includes a Bluetooth beacon identifier received by the smart frame.

Example 13 includes the subject matter of any of Examples 1-12 and 14-37, wherein the cellular signal further includes data pertaining to a current operational status of the smart frame.

Example 14 includes the subject matter of any of Examples 1-13 and 15-37, wherein the cellular signal further includes data pertaining to the detected motion of the smart frame.

Example 15 includes the subject matter of any of Examples 1-14 and 16-37, wherein the cellular communication module is configured as a long-term evolution (LTE) CatM cellular modem configured to communicate over an LTE-CatM1 network.

Example 16 includes the subject matter of any of Examples 1-15 and 17-37, wherein the cellular communication module is configured as a long-term evolution (LTE)-1 cellular modem or a long-term evolution (LTE)-4 cellular modem.

Example 17 includes the subject matter of any of Examples 1-16 and 18-37, wherein the cellular communication module is configured to communicate utilizing a low-power wide-area network (LPWAN) communication protocol.

Example 18 includes the subject matter of any of Examples 1-17 and 19-37, wherein the LPWAN communication protocol includes one or more narrowband Internet of things (NB-IoT) communication protocols.

Example 19 includes the subject matter of any of Examples 1-18 and 20-37, wherein the LPWAN communication protocol includes one or more long-range wide-area network (LoRaWAN) communication protocols.

Example 20 includes the subject matter of any of Examples 1-19 and 21-37, wherein the cellular communication module is configured to transmit the cellular signal to a database server external to the smart frame.

Example 21 includes the subject matter of any of Examples 1-20 and 22-37, wherein the electronics assembly further includes a Bluetooth communication module configured to transmit a Bluetooth signal including data pertaining to a current physical location of the smart frame.

Example 22 includes the subject matter of any of Examples 1-21 and 23-37, wherein the Bluetooth signal further includes data pertaining to an identifier of a near-field communication (NFC) tag hosted by a vehicle associated with the vehicle registration plate and read by the smart frame.

Example 23 includes the subject matter of any of Examples 1-22 and 24-37, wherein the Bluetooth communication module is configured to communicate utilizing a Bluetooth Low Energy (BLE) protocol.

Example 24 includes the subject matter of any of Examples 1-23 and 25-37, wherein the Bluetooth communication module is configured to transmit the Bluetooth signal to a computing device external to the smart frame.

Example 25 includes the subject matter of any of Examples 1-24 and 26-37, wherein the electronics assembly further includes a Bluetooth communication module configured to receive a Bluetooth signal including at least one of: (a) data pertaining to an identifier of a vehicle associated with the vehicle registration plate, wherein the Bluetooth signal originates from at least one of: (i) a Bluetooth-compatible key fob or dongle; and (ii) a Bluetooth-compatible element of the vehicle itself; (b) data pertaining to a current physical location of the smart frame relative to a Bluetooth beacon; and (c) data pertaining to an alarm or status alert to be output by the smart frame.

Example 26 includes the subject matter of any of Examples 1-25 and 27-37, wherein the electronics assembly further includes a tampering detection device configured to detect at least one of: (a) tampering with the smart frame; and (b) unauthorized removal of the vehicle registration plate from the smart frame.

Example 27 includes the subject matter of any of Examples 1-26 and 28-37, wherein the cellular signal further includes data pertaining to at least one of: (a) the detected tampering with the smart frame; and (b) the detected unauthorized removal of the vehicle registration plate from the smart frame.

Example 28 includes the subject matter of any of Examples 1-27 and 29-37, wherein the electronics assembly further includes at least one of an audio output device and an optical output device configured to output a signal by which the smart frame is able to be physically located in a given space by a user.

Example 29 includes the subject matter of any of Examples 1-28 and 30-37, wherein the electronics assembly further includes a power supply configured to provide electrical energy to the electronics assembly.

Example 30 includes the subject matter of any of Examples 1-29 and 31-37, wherein the power supply includes a battery.

Example 31 includes the subject matter of any of Examples 1-30 and 32-37, wherein the battery is a lithium-ion polymer (LiPo) battery.

Example 32 includes the subject matter of any of Examples 1-31 and 33-37, wherein the power supply includes a photovoltaic module configured to convert light energy to electrical energy provided to the electronics assembly.

Example 33 includes the subject matter of any of Examples 1-32 and 34-37, further including an electronics housing portion at least partially housing the electronics assembly.

Example 34 includes the subject matter of any of Examples 1-33 and 35-37, wherein the electronics housing portion is configured to be mounted to a vehicle associated with the vehicle registration plate.

Example 35 includes the subject matter of any of Examples 1-34 and 36-37, further including a frame portion configured to interface with the electronics housing portion such that the vehicle registration plate is disposed between the frame portion and the electronics housing portion in a manner allowing viewing of the vehicle registration plate through the frame portion.

Example 36 is a system. The system includes: (a) a smart frame including the subject matter of any of Examples 1-35 and 37; and (b) at least one of: (i) a near-field communication (NFC) tag configured to be hosted by a vehicle associated with the vehicle registration plate and to wirelessly communicate with the smart frame; (ii) a Bluetooth-compatible key fob or dongle configured to wirelessly communicate with the smart frame; and (iii) a Bluetooth beacon configured to wirelessly communicate with the smart frame.

Example 37 includes the subject matter of any of Examples 1-36, further including a database server configured to store: (a) the data pertaining to the current geographic location of the smart frame; (b) data pertaining to an identifier of the NFC tag; and (c) a vehicle identification number (VIN) or other identifier of the vehicle.

Example 38 is a method. The method includes detecting motion of a smart frame for a vehicle registration plate. The method also includes in response to the detected motion of the smart frame, outputting a signal which results in the smart frame receiving a global navigational satellite system (GNSS) signal including data pertaining to a current geographic location of the smart frame. The method further includes transmitting a cellular signal including the data pertaining to the current geographic location of the smart frame.

Example 39 includes the subject matter of any of Examples 38 and 40-60, further including detecting a change in physical orientation of the smart frame, and, in response to the detected change in physical orientation of the smart frame, outputting a signal which results in the smart frame receiving a near-field communication (NFC) signal from an NFC tag hosted by a vehicle associated with the vehicle registration plate, the NFC signal including data pertaining to an identifier of the NFC tag.

Example 40 includes the subject matter of any of Examples 38-39 and 41-60, wherein the detected change in physical orientation is one from a substantially horizontal orientation of the smart frame to a substantially vertical orientation of the smart frame.

Example 41 includes the subject matter of any of Examples 38-40 and 42-60, wherein the cellular signal further includes data pertaining to the detected change in physical orientation of the smart frame.

Example 42 includes the subject matter of any of Examples 38-41 and 43-60, wherein the cellular signal further includes the data pertaining to the identifier of the NFC tag.

Example 43 includes the subject matter of any of Examples 38-42 and 44-60, wherein the identifier of the NFC tag includes an identification (ID) code of the NFC tag.

Example 44 includes the subject matter of any of Examples 38-43 and 45-60, wherein the data pertaining to the current geographic location of the smart frame includes latitude and longitude coordinates.

Example 45 includes the subject matter of any of Examples 38-44 and 46-60, wherein the data pertaining to the current geographic location of the smart frame includes geofencing information.

Example 46 includes the subject matter of any of Examples 38-45 and 47-60, wherein the data pertaining to the current geographic location of the smart frame includes a Bluetooth beacon identifier received by the smart frame.

Example 47 includes the subject matter of any of Examples 38-46 and 48-60, wherein the cellular signal further includes data pertaining to a current operational status of the smart frame.

Example 48 includes the subject matter of any of Examples 38-47 and 49-60, wherein the cellular signal further includes data pertaining to the detected motion of the smart frame.

Example 49 includes the subject matter of any of Examples 38-48 and 50-60, wherein the cellular signal is based on a low-power wide-area network (LPWAN) communication protocol.

Example 50 includes the subject matter of any of Examples 38-49 and 51-60, wherein the cellular signal is based on one or more narrowband Internet of things (NB-IoT) communication protocols.

Example 51 includes the subject matter of any of Examples 38-50 and 52-60, wherein the cellular signal is based on one or more long-range wide-area network (LoRaWAN) communication protocols.

Example 52 includes the subject matter of any of Examples 38-51 and 53-60, wherein the cellular signal is transmitted to a database server external to the smart frame.

Example 53 includes the subject matter of any of Examples 38-52 and 54-60, further including transmitting a Bluetooth signal including data pertaining to a current physical location of the smart frame.

Example 54 includes the subject matter of any of Examples 38-53 and 55-60, wherein the Bluetooth signal further includes data pertaining to an identifier of a near-field communication (NFC) tag hosted by a vehicle associated with the vehicle registration plate and read by the smart frame.

Example 55 includes the subject matter of any of Examples 38-54 and 56-60, wherein the Bluetooth signal is based on a Bluetooth Low Energy (BLE) protocol.

Example 56 includes the subject matter of any of Examples 38-55 and 57-60, wherein the Bluetooth signal is transmitted to a computing device external to the smart frame.

Example 57 includes the subject matter of any of Examples 38-56 and 58-60, further including receiving a Bluetooth signal including at least one of: (a) data pertaining to an identifier of a vehicle associated with the vehicle registration plate, wherein the Bluetooth signal originates from at least one of: (i) a Bluetooth-compatible key fob or dongle; and (ii) a Bluetooth-compatible element of the vehicle itself; (b) data pertaining to a current physical location of the smart frame relative to a Bluetooth beacon; and (c) data pertaining to an alarm or status alert to be output by the smart frame.

Example 58 includes the subject matter of any of Examples 38-57 and 59-60, further including detecting at least one of: (a) tampering with the smart frame; and (b) unauthorized removal of the vehicle registration plate from the smart frame.

Example 59 includes the subject matter of any of Examples 38-58 and 60, wherein the cellular signal further includes data pertaining to at least one of: (a) the detected tampering with the smart frame; and (b) the detected unauthorized removal of the vehicle registration plate from the smart frame.

Example 60 includes the subject matter of any of Examples 38-59, further including outputting at least one of an audio output signal and an optical output signal by which the smart frame is able to be physically located in a given space by a user.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description. Future-filed applications claiming priority to this 10 application may claim the disclosed subject matter in a different manner and generally may include any set of one or more limitations as variously disclosed or otherwise demonstrated herein.

What is claimed is:

1. A smart frame for a vehicle registration plate, the smart frame comprising:
   an electronics assembly comprising:
      a global navigational satellite system (GNSS) module configured to receive a GNSS signal including data pertaining to a current geographic location of the smart frame;
      a cellular communication module configured to transmit a cellular signal including the data pertaining to the current geographic location of the smart frame; and
      a motion detection device configured to detect motion of the smart frame and, in response to detection thereof, output a signal which results in the GNSS module activating to receive the GNSS signal, wherein the signal which results in the GNSS module activating to receive the GNSS signal causes the GNSS module to transition from a lower power state to a higher power state, in which higher power state the GNSS signal is received by the GNSS module.

2. The smart frame of claim 1, wherein the electronics assembly further comprises a near-field communication (NFC) module configured to receive an NFC signal from an NFC tag hosted by a vehicle associated with the vehicle registration plate, the NFC signal including data pertaining to an identifier of the NFC tag.

3. The smart frame of claim 2, wherein the motion detection device is further configured to detect a change in physical orientation of the smart frame and, in response to detection thereof, output a signal which results in the NFC module activating to receive the NFC signal.

4. The smart frame of claim 3, wherein the cellular signal further includes data pertaining to the detected change in physical orientation of the smart frame.

5. The smart frame of claim 2, wherein the cellular signal further includes the data pertaining to the identifier of the NFC tag.

6. The smart frame of claim 1, wherein:
   the smart frame comprises an electronics housing portion at least partially housing the electronics assembly; and
   the electronics assembly further comprises an assembly comprising a GNSS antenna communicatively coupled with the GNSS module and a cellular antenna communicatively coupled with the cellular communication module, wherein the GNSS antenna and the cellular antenna extend beyond an end of the electronics housing portion.

7. The smart frame of claim 1, wherein the data pertaining to the current geographic location of the smart frame comprises a Bluetooth beacon identifier received by the smart frame.

8. The smart frame of claim 1, wherein the cellular signal further includes data pertaining to a current operational status of the smart frame.

9. The smart frame of claim 1, wherein the cellular signal further includes data pertaining to at least one of:
the detected motion of the smart frame; and
the current geographic location of the smart frame.

10. The smart frame of claim 1, wherein the electronics assembly further comprises a Bluetooth communication module configured to transmit a Bluetooth signal including data pertaining to a current physical location of the smart frame.

11. The smart frame of claim 1, wherein the electronics assembly further comprises a Bluetooth communication module configured to receive a Bluetooth signal including at least one of:
data pertaining to an identifier of a vehicle associated with the vehicle registration plate, wherein the Bluetooth signal originates from at least one of:
a Bluetooth-compatible key fob or dongle; and
a Bluetooth-compatible element of the vehicle itself;
data pertaining to a current physical location of the smart frame relative to a Bluetooth beacon; and
data pertaining to an alarm or status alert to be output by the smart frame.

12. The smart frame of claim 1, wherein the electronics assembly further comprises a tampering detection device configured to detect at least one of:
tampering with the smart frame; and
unauthorized removal of the vehicle registration plate from the smart frame.

13. The smart frame of claim 12, wherein the cellular signal further includes data pertaining to at least one of:
the detected tampering with the smart frame; and
the detected unauthorized removal of the vehicle registration plate from the smart frame.

14. The smart frame of claim 1, wherein the electronics assembly further comprises at least one of an audio output device and an optical output device configured to output a signal by which the smart frame is able to be physically located in a given space by a user.

15. A system comprising:
the smart frame of claim 1; and
at least one of:
a near-field communication (NFC) tag configured to be hosted by a vehicle associated with the vehicle registration plate and to wirelessly communicate with the smart frame;
a Bluetooth-compatible key fob or dongle configured to wirelessly communicate with the smart frame; and
a Bluetooth beacon configured to wirelessly communicate with the smart frame.

16. The system of claim 15, further comprising a database server configured to store:
the data pertaining to the current geographic location of the smart frame;
data pertaining to an identifier of the NFC tag; and
a vehicle identification number (VIN) or other identifier of the vehicle.

17. A smart frame for a vehicle registration plate, the smart frame comprising:
an electronics assembly comprising:
a global navigational satellite system (GNSS) module configured to receive a GNSS signal including data pertaining to a current geographic location of the smart frame;
a cellular communication module configured to transmit a cellular signal including the data pertaining to the current geographic location of the smart frame;
a motion detection device configured to detect motion of the smart frame and, in response to detection thereof, output a signal which results in the GNSS module activating to receive the GNSS signal; and
a Bluetooth communication module configured to transmit a Bluetooth signal including data pertaining to a current physical location of the smart frame, wherein the Bluetooth signal further includes data pertaining to an identifier of a near-field communication (NFC) tag hosted by a vehicle associated with the vehicle registration plate and read by the smart frame.

18. A method comprising:
detecting motion of a smart frame for a vehicle registration plate;
in response to the detected motion of the smart frame, outputting a signal which results in the smart frame receiving a global navigational satellite system (GNSS) signal including data pertaining to a current geographic location of the smart frame, wherein the signal which results in the smart frame receiving the GNSS signal causes a GNSS module of the smart frame to transition from a lower power state to a higher power state, in which higher power state the GNSS signal is received by the GNSS module; and
transmitting a cellular signal including the data pertaining to the current geographic location of the smart frame.

19. The method of claim 18, further comprising:
detecting a change in physical orientation of the smart frame; and
in response to the detected change in physical orientation of the smart frame, outputting a signal which results in the smart frame receiving a near-field communication (NFC) signal from an NFC tag hosted by a vehicle associated with the vehicle registration plate, the NFC signal including data pertaining to an identifier of the NFC tag.

20. The method of claim 19, wherein the detected change in physical orientation is one from a substantially horizontal orientation of the smart frame to a substantially vertical orientation of the smart frame.

21. The method of claim 19, wherein the cellular signal further includes data pertaining to the detected change in physical orientation of the smart frame.

22. The method of claim 19, wherein the cellular signal further includes the data pertaining to the identifier of the NFC tag.

23. The method of claim 18, wherein the data pertaining to the current geographic location of the smart frame comprises a Bluetooth beacon identifier received by the smart frame.

24. The method of claim 18, wherein the cellular signal further includes data pertaining to at least one of:
the detected motion of the smart frame; and
the current geographic location of the smart frame.

25. The method of claim 18, further comprising:
transmitting a Bluetooth signal including data pertaining to a current physical location of the smart frame.

26. The method of claim 18, further comprising:
receiving a Bluetooth signal including at least one of:
data pertaining to an identifier of a vehicle associated with the vehicle registration plate, wherein the Bluetooth signal originates from at least one of:
a Bluetooth-compatible key fob or dongle; and
a Bluetooth-compatible element of the vehicle itself;
data pertaining to a current physical location of the smart frame relative to a Bluetooth beacon; and data pertaining to an alarm or status alert to be output by the smart frame.

27. The method of claim 18, further comprising:
detecting at least one of:
tampering with the smart frame; and
unauthorized removal of the vehicle registration plate from the smart frame.

28. The method of claim 18, further comprising:
outputting at least one of an audio output signal and an optical output signal by which the smart frame is able to be physically located in a given space by a user.

29. A method comprising:
detecting motion of a smart frame for a vehicle registration plate;
in response to the detected motion of the smart frame, outputting a signal which results in the smart frame receiving a global navigational satellite system (GNSS) signal including data pertaining to a current geographic location of the smart frame;
transmitting a cellular signal including the data pertaining to the current geographic location of the smart frame; and
transmitting a Bluetooth signal including data pertaining to a current physical location of the smart frame, wherein the Bluetooth signal further includes data pertaining to an identifier of a near-field communication (NFC) tag hosted by a vehicle associated with the vehicle registration plate and read by the smart frame.

* * * * *